(12) United States Patent
Johns et al.

(10) Patent No.: US 11,637,859 B1
(45) Date of Patent: *Apr. 25, 2023

(54) SYSTEM AND METHOD FOR ANALYZING BINARY CODE FOR MALWARE CLASSIFICATION USING ARTIFICIAL NEURAL NETWORK TECHNIQUES

(71) Applicant: FireEye, Inc., Milpitas, CA (US)

(72) Inventors: Jeffrey Thomas Johns, Leesburg, VA (US); Brian Sanford Jones, Morrisville, NC (US); Scott Eric Coull, Cary, NC (US)

(73) Assignee: Mandiant, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/461,925

(22) Filed: Aug. 30, 2021

Related U.S. Application Data

(62) Division of application No. 15/796,680, filed on Oct. 27, 2017, now Pat. No. 11,108,809.

(51) Int. Cl.
*H04L 29/06* (2006.01)
*H04L 9/40* (2022.01)
(Continued)

(52) U.S. Cl.
CPC ............ *H04L 63/145* (2013.01); *G06F 21/56* (2013.01); *G06F 21/562* (2013.01); *G06N 3/04* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 4,292,580 | A | 9/1981 | Ott et al. |
| 5,175,732 | A | 12/1992 | Hendel et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf-.

(Continued)

*Primary Examiner* — Andrew J Steinle

(57) ABSTRACT

A system for detecting whether a file including content is associated with a cyber-attack is described. The content may include an executable file for example. The system includes an intelligence-driven analysis subsystem and a computation analysis subsystem. The intelligence-driven analysis subsystem is configured to (i) receive the file, (ii) inspect and compute features of the file for indicators associated with a cyber-attack, and (iii) produce a first output representing the detected indicators. The computational analysis subsystem includes an artificial neural network to (i) receive a network input being a first representation of at least one section of binary code from the file as input, and (ii) process the first representation of the section to produce a second output. The first output and the second output are used in determination a classification assigned to the file.

23 Claims, 15 Drawing Sheets

(51) Int. Cl.
 *G06F 21/56* (2013.01)
 *G06N 3/04* (2023.01)

(56) References Cited

U.S. PATENT DOCUMENTS

| | | | |
|---|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 3,006,305 A1 | 8/2011 | Aziz |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |

(56) References Cited

U.S. PATENT DOCUMENTS

| | | | |
|---|---|---|---|
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,690,938 B1 | 6/2017 | Saxe et al. |
| 9,705,904 B1* | 7/2017 | Davis .................. H04L 63/1408 |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |

(56) References Cited

U.S. PATENT DOCUMENTS

| | | |
|---|---|---|
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1* | 8/2018 | Singh .................... H04L 63/145 |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 11,108,809 B2 | 8/2021 | Johns et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |

(56) References Cited

U.S. PATENT DOCUMENTS

| | | |
|---|---|---|
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Proves et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |

(56) References Cited

U.S. PATENT DOCUMENTS

| | | |
|---|---|---|
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupar et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0205014 A1* | 8/2013 | Muro ............... G06Q 10/06 709/224 |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0063169 A1* | 3/2018 | Zhao ............... H04L 63/1416 |
| 2018/0121316 A1 | 5/2018 | Ismael et al. |
| 2018/0288077 A1 | 10/2018 | Siddiqui et al. |
| 2019/0132334 A1 | 5/2019 | Johns et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |
| WO | 2017/011702 A1 | 1/2017 |
| WO | WO-2017011702 A1 * | 1/2017 ........... G06F 21/562 |

OTHER PUBLICATIONS

"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.jsp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

(56) References Cited

OTHER PUBLICATIONS

Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved fom the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBM:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Krizhevsky, A., Sutskever, I., & Hinton, G. E. (2012). Imagenet classification with deep convolutional neural networks. in Advances in neural information processing systems (pp. 1097-1105).
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. Std 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
PCT/US2018/055508 filed Oct. 11, 2018 International Search Report and Written Opinion dated Dec. 12, 2018.
Reiner Sailer, Enriquillo Valdez, Trent Jaeger, Roonald Perez, Leendert van Doorn John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham , "Insertion, Evasion, and Denial of Service: Eluding Network Intrusion Detection", Secure Networks, ("Ptacek"), (Jan. 1998).
U.S. Appl. No. 15/796,680, filed Oct. 27, 2017 Final Office Action dated Dec. 10, 2020.
U.S. Appl. No. 15/796,680, filed Oct. 27, 2017 Final Office Action dated Mar. 18, 2020.
U.S. Appl. No. 15/796,680, filed Oct. 27, 2017 Non-Final Office Action dated Dec. 6, 2019.
U.S. Appl. No. 15/796,680, filed Oct. 27, 2017 Non-Final Office Action dated Jun. 30, 2020.
U.S. Appl. No. 15/796,680, filed Oct. 27, 2017 Notice of Allowance dated Apr. 23, 2021.
Venezia, Paul , "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.

(56) References Cited

OTHER PUBLICATIONS

Xu, K., Ba, J., Kiros, R., Cho, K., Courville, A., Salakhudinov, R., . . . & Bengio, Y. (Jun. 2015). Show, attend and tell: Neural image caption generation with visual attention. In International Conference on Machine Learning (pp. 2048-2057).

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

Zhang, X., Zhao, J., & LeCun, Y. (2015). Character-level convolutional networks for text classification. In Advances in neural information processing systems (pp. 649-657).

* cited by examiner

SYSTEM AND METHOD FOR ANALYZING BINARY CODE FOR MALWARE CLASSIFICATION USING ARTIFICIAL NEURAL NETWORK TECHNIQUES

CROSS-REFERENCES TO RELATED APPLICATIONS

This application is a divisional of U.S. patent application Ser. No. 15/796,680 filed Oct. 27, 2017, now U.S. Pat. No. 11,108,809 issued Aug. 31, 2021, the entire contents of which are incorporated by reference herein.

FIELD

Embodiments of the disclosure relate to the field of cyber security. More specifically, one embodiment of the disclosure relates to a system and computerized method for statically identifying whether an object, such as an executable file for example, is associated with a cyber-attack using artificial neural network techniques, which are often referred to as "deep learning."

GENERAL BACKGROUND

Over the last decade, malware detection has become a pervasive and growing problem, especially given the increased volume of new applications available for download. Currently, malware detection systems are being deployed by companies to thwart cyber-attacks originating from downloaded executable files. These conventional malware detection systems utilize machine learning techniques which examine content (e.g., de-compiled code) of the executable file in connection with signatures associated with known malware. Hence, conventional malware detection systems are reliant on expert analysis in formulating these signatures. Given the static nature of these signatures, however, detection of new ("zero-day") or polymorphic malware has become more and more challenging in order to successfully defend a company or an individual user against cyber-attacks.

In some instances, a cyber-attack is conducted by infecting a targeted network device with malware, often in the form of an executable file, which is designed to adversely influence or attack normal operations of the targeted network device (e.g., computer, smartphone, wearable technology, etc.). One type of malware may include bots, spyware, or another executable embedded into downloadable content, which operates within the network device without knowledge or permission by the user or an administrator to exfiltrate stored data. Another type of malware may be designed as an executable file that, during processing, conducts a phishing attack by deceiving the user as to the actual recipient of data provided by that user.

Recently, significant efforts have been expended on creating different types of malware detection systems, including systems using artificial neural networks (generally referred to as a "neural network"). A neural network is logic that is designed and trained to recognize patterns in order to classify incoming data as malicious (malware) or benign. Prior approaches to using neural networks avoided some of the drawbacks of traditional malware detection systems by eliminating the need for labor intensive analyses of previous detected malware by highly trained cyber-security analysts to determine features relevant to malware detection; however, known neural network approaches to malware detection tend to be complicated in application, including training to achieve accurate classifications. It would be desirable to provide enhanced techniques effective in detecting malware with reduced complexity over other neural network approaches.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed embodiments and implementations.

FIGS. 6A-6I provide an illustrative example of operations conducted on an extracted binary code section of an executable file and subsequent representations of the binary code section substantially performed by logic of the computational analysis subsystem of FIGS. 4A-4B.

DETAILED DESCRIPTION

Figure 1:
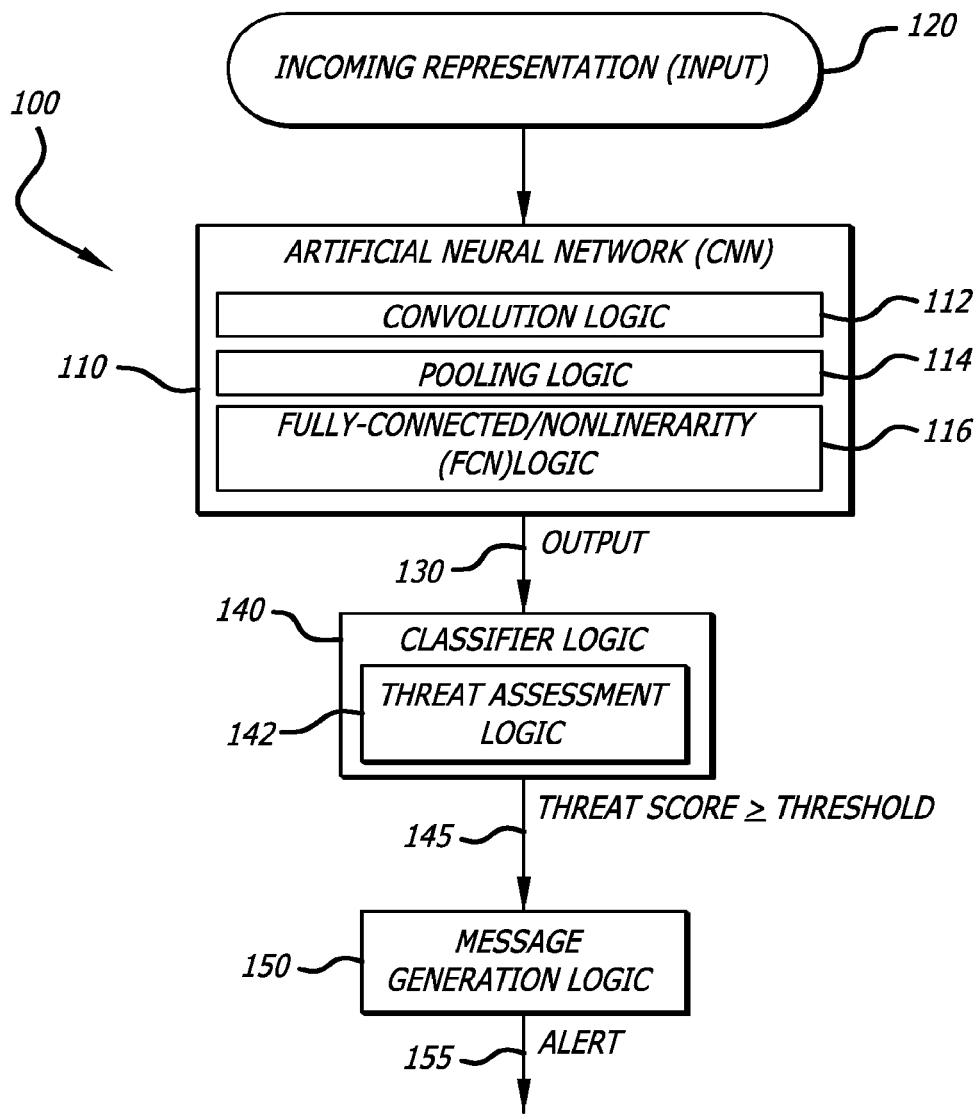
FIG. 1 is an exemplary block diagram illustrating logic included within embodiments of a cyber-security system described herein.

Embodiments of subsystems and methods of a cyber-security system configured to determine whether an object is associated with a cyber-attack (i.e., malicious). One embodiment of the cyber-security system can be used to analyze raw, binary code of the executable file for malware. According to one embodiment of the disclosure, binary code of an incoming object (e.g., an executable file) undergoes feed-forward processing by a convolutional neural network (CNN), trained using supervised learning, to isolate features associated with the binary code that aid in the classification of the executable file as benign or malicious. Significantly, the binary code can be processed in this manner directly, without intermediate analysis or translation. To provide a more robust analysis, CNN-based and intelligence-driven analyses may be performed concurrently (i.e., overlapping at least partially in time), as described below. It is contemplated that other embodiments of the cyber-security system may be implemented that analyze various types of files for malware other than executable files, such as text files, Portable Document Format (PDF) files, Presentation File Format (PPT) files, scripts, for example. In general, the term "file" may pertain to any file type.

I. Overview

As set forth below, one embodiment of the cyber-security system includes a plurality of subsystems that perform neural network analyses on data based on content from a file (e.g., executable file), and in some embodiments, leveraging insight offered by intelligence-driven analyses. One of these subsystems, referred to as a computational analysis subsystem, employs an artificial neural network to automatically determine whether certain features, which are associated with one or more patterns, are present (or absent) in the binary code of an executable file. The presence (or absence) of these features allows the executable file to be classified as malicious or benign. It should be noted that this determination is made without the need to manually pre-identify the specific features to seek within the byte code.

For at least one embodiment of the disclosure, this computational analysis subsystem leverages a deep neural network, such as a convolutional neural network (CNN) for example, which operates on an input based directly on the binary code of the executable file, rather than on a disassembled version of that code. The operations of the CNN are pre-trained (conditioned) using labeled training sets of malicious and/or benign binary code files in order to identify features, corresponding to the binary code of the executable file, that are probative of how the executable file should be classified. Communicatively coupled to and functioning in concert with the CNN, a classifier, operating in accordance with a set of classification rules, receives an output from the CNN and determines a classification assigned to the executable file indicating whether the executable file is malicious or benign.

According to other embodiments of the disclosure, operating in conjunction with the computational analysis subsystem, the cyber-security system may also include an intelligence-driven analysis subsystem, whose operations are more directly influenced by and therefore depend on analyses of previously detected malware performed by highly trained cyber-security analysts. More specifically, based on intelligence generated through analyses of known malicious executable files and benign executable files by highly trained cyber-security analysts, this intelligence-driven subsystem is configured to statically (without execution) identify "indicators" in the executable file through their automatic inspection and evaluation, which permit their classification. In general, an "indicator" is one or more suspicious or anomalous characteristics of the executable file, which may be directed to the content as well as the format or delivery of such content. Accordingly, the prior work of the cyber-security analysts is used to identify the indicators that differentiate malicious from benign executable files and then these analyst results are used to configure the intelligence-driven analysis subsystem. It should be emphasized that the determination of malware in unknown (e.g., previously unanalyzed) executable files proceeds automatically and without human intervention.

Additionally, in embodiments configured to receive network traffic, this intelligence-driven subsystem can also statically identify indicators in communication packets containing the executable file. The inspection and evaluation performed may involve identifying any communication protocol anomalies or suspicious packet content, as well as using signature (hash) matching, heuristics and pattern matching, as well as other statistical or deterministic techniques, in each case, informed and guided by prior work of the analysts.

As an illustrative example, the analysts may identify the anomalies, signatures of known malware, and patterns associated with known malware and other tell-tale attributes, which can be used in generating computer applied rules used in the intelligence-driven analysis subsystem. It is worth noting that none of these analyst results are needed by the computational analysis subsystem, which only requires the labeled training sets of malicious and/or benign binary code files for training purposes. The classifier can then use these results of both the computational analysis and the intelligence-driven analysis to classify the executable file. In some embodiments, the results of the intelligence-driven analysis subsystem can be placed into a format common to the output provided by the computational analysis subsystem, and thereafter, routed to a post-analysis subsystem for classification.

More specifically, embodiments of the disclosure will now be described in greater detail. According to one embodiment of the disclosure, a cyber-security system is configured to analyze an executable file (of any size), where the cyber-security system includes a computational analysis subsystem. As described herein, this computational analysis subsystem includes a pre-processor, a CNN and, in some embodiments, a separate classifier, followed by a message generator. Each of these components may be software running on a network device or multiple (two or more) network devices that collectively operate to determine whether the executable file is associated with a cyber-attack (i.e. malicious) or benign. Herein, an "executable file" refers to a collection of digital data that is not readily readable by humans and, when processed by a processor within a network device, causes performance of a particular task or tasks (e.g., write to memory, read from memory, jump to an address to start a process, etc.). The digital data may include binary code, namely a collection of bit patterns for example, each corresponding to an executable command and/or data, along with other data resources (e.g., values for static variables, etc.). Examples of the binary code may include, but are not limited or restricted to, and the term is often used synonymously with, an executable, machine code (e.g., set of machine readable, processor-executable instructions), or object code. The executable file may be provided in a Portable Executable (PE) format, namely a data structure that encapsulates information necessary for a Windows® Operating System (OS) loader to manage the wrapped binary code, although other formats may be used.

The CNN includes a plurality of layers (logic modules) that together implement an overall programmatic function, which is generated and tuned as described below. Each of the layers operates both as a portion of the overall programmatic function and as a plurality of operations executed by kernels (i.e., execution elements sometimes called "neurons"), where the operations of each of the layers implement one or more layer functions. The layout and architecture of the CNN in terms of the number and order of the layers and their respective layer functions, fall within the ordinary skill of practitioners in this art in light of this disclosure, and so only illustrative examples of the architecture will be described herein.

Operating as part of an input layer for the CNN deployed within the computational analysis subsystem, the pre-processor is configured to receive an executable file. In some embodiments, the pre-processor may receive the executable file separately or encapsulated as a plurality of binary packets in transit over a network. The content of the binary packets may be extracted from portions of the binary packets (e.g., payloads), and thereafter, aggregated (reassembled) to produce the executable file. Where some content of the binary packets is encoded and/or compressed, the pre-processor may feature decode logic and/or decompression logic to perform such operations on the content before the content is aggregated to produce the executable file.

Upon receiving the executable file, the pre-processor is responsible for selecting a section of binary code from the executable file for analysis. In some embodiments, the pre-processor may select a plurality of subsections of the binary code for analysis by the CNN, each subsection being combined (or retained separately) and conditioned for analysis. The disclosure in connection with FIG. 5 will describe this selection process in considerable detail. Of note, this selection process requires neither the employment nor training of an attention mechanism, a component known in the art. The size of each selected section of binary code (and/or from where in the executable file the binary code section is selected) may be a static (constant) value or dynamic based on rules established during the training and dependent on attributes of the binary code such as length or format. After the binary code section(s) is (are) extracted (and padding added if needed), the pre-processor may further encode the binary code section(s) to generate an input for the CNN. The input includes a first representation of the binary code (e.g., input tensor) in a form and format suitable for processing by the CNN. The (byte) encoding may be conducted by a variety of techniques, including "one hot encoding" or "embedding," as described below.

Communicatively coupled to the pre-processor, the CNN may be logically represented by a plurality of executable logic layers including one or more convolution layers, one or more pooling layers, and one or more fully connected/nonlinearity (FCN) layer. These layers generally represent weighting, biasing and spatial reduction operations performed by their convolution logic, pooling logic and FCN logic deployed within the cyber-security system.

According to one embodiment of the disclosure, each convolution layer is configured to (i) process an incoming representation (e.g., in the case of the first convolution layer of the CNN, the first representation of the binary code) by applying operations executing a portion of the overall programmatic function (referred to as a "programmatic layer function") on the incoming representation to produce a resultant representation (e.g., an output tensor). These operations may be performed using one or more convolution filters, which are pre-trained using a training set including patterns associated with known benign executable files and/or malicious executable files. The size of the resultant representation may be based on a number of hyper-parameters that influence operations of the convolution layer, including the number, length and width of the convolution filter(s), stride length, and an amount of zero padding.

After each convolution layer, various operations may be performed on the resultant representation. As one example, after performing a convolution operation on the first representation by a first convolution layer (of the one or more convolution layers), element-wise nonlinear operations (e.g., rectified linear unit or "ReLU") may be performed on the resultant representation to map all negative values to "0" in order to introduce nonlinearities to the resultant representation.

As another example, after performing a convolution operation in a convolution layer to produce a resultant representation, a pooling layer (of the one or more pooling layers) may transform the resultant representation by reducing the spatial dimensions of the resultant representation provided to the next convolutional layer or the FCN layer. This may be viewed as compressing the data of that resultant representation from the convolution layer. The pooling operation does not affect the depth dimension of the resultant representation, where the depth dimension equates to the number of convolution filters. Sometimes, the pooling operation is referred to as "down-sampling," given that the reduction in size of the resultant representation leads to loss of location information. However, such information loss may be beneficial for overall CNN performance as the decreased size leads to lesser computational overhead for a next convolutional layer (since embodiments of the CNN likely support multiple convolution layers) or a next FCN layer, e.g., where the pooling is being conducted after the final convolution operation has been performed by the CNN. Different types of pooling may include "max pooling," "average pooling," "dynamic pooling," as known in the art.

As yet another example of a weighting and/or biasing operation, the FCN layer receives the resultant representation after convolution and/or pooling operations. The FCN layer applies weights and biases as trained by the training set described above to produce a vector, which may operate as the "output" for the CNN. The FCN layer applies the learned weights and biases to account for different nonlinear combinations and ordering of the features detected during preceding convolution/pooling operations.

Communicatively coupled to the CNN, a classifier is configured to receive the output from the CNN and determine a classification assigned to (and stored in memory in association with) the executable file, based, at least in part, on a threat score generated based on the received output from the CNN. The threat score is generated by threat assessment logic, which may perform a sigmoid function or other function to normalize a scalar value. The normalized scalar value represents the threat score within a prescribed range, and the executable file is considered to be malicious when the scalar value exceeds a threshold value within the prescribed range.

Additionally, a message generator may be deployed to generate an alert or other message. The alert may be transmitted to a system administrator or cyber-security administrator to report on results of the analysis, that is, a classification of an executable file as malicious and thus associated with a cyber-attack. Where the computational analysis subsystem is incorporated into or is in communication with a network device (such as a laptop, tablet or other endpoint) under user control, the message may be provided (e.g., on screen) to the user of the device. Moreover, the message may be provided to one or more other components (e.g., operating system or agent) running within the network device for example, to influence its operation such as signaling to cause the network device to block processing (e.g., download, loading or execution) of the executable file on the network device.

According to another embodiment of the disclosure, operating concurrently with the computational analysis subsystem described above, the cyber-security system may include an intelligence-driven analysis subsystem, which is configured to (i) receive the executable file, (ii) inspect the executable file (and, in some embodiments and/or deployments, of communication packets carrying the executable file) for indicators associated with a cyber-attack based on intelligence generated by a cyber-security analyst, as described above, (iii) compute features of the executable file for indicators, and (iv) produce an output representing the features.

The static analysis conducted by the intelligence-driven analysis subsystem may involve an inspection of the binary packets based on known (previously detected) malicious executable files and/or benign executable files. The inspection of the binary packets may involve identifying any communication protocol anomalies and suspicious content in the header, payload, etc. The inspection of the payload may include extraction and re-assembly of the executable file, followed by an inspection of the header and other portions of that executable file. Of course, where the executable file is received directly without being carried in communication packets, then the packet inspection is of no avail. Thereafter, the inspection can be conducted in a variety of ways, using signature hashes of known malicious executable files, heuristics and pattern matching based on known executable files, or the like. In some embodiments, the results of the intelligence-driven analysis, including the features associated with the detected indicators, may be provided to the post-analysis subsystem.

The concurrent operations of the computational analysis subsystem and the intelligence-driven analysis subsystem complement each other. The intelligence-driven analysis subsystem targets an analysis of context, e.g., anomalous data placement in binary packets, communication protocol anomalies, and/or known malicious and benign patterns associated with malicious and benign executable files. The computational analysis subsystem targets digital bit patterns, independent of context and based on training by a training set including hundreds of thousands or millions of benign and/or malicious executable files. Hence, the computational analysis subsystem is more content centric, and thus, coding tendencies or styles by malware authors that may be missed in the intelligence-driven analysis (absent profound observational skills and too often luck on the part of the analyst) may assist in the detection of zero-day (first time) cyber-attacks.

Herein, the post-analysis subsystem is communicatively coupled to both the computational analysis subsystem and the intelligence-driven analysis subsystem, described above. The post-analysis subsystem may include (i) grouping logic and (ii) a classifier. According to one embodiment of the disclosure, the grouping logic may be configured to perform one or more mathematical or logical operations (e.g., concatenation) on content from the output from the computational analysis subsystem and content from the output from the intelligence-driven analysis subsystem to generate a collective output. The classifier, as described above, is configured to receive the collective output from the grouping logic (subject to further fully connected/nonlinearity operations) and determine a classification assigned to the executable file based, at least in part, on a threat score generated based on the collective output. As also described above, the message generator may be deployed to generate a message to one or more components operating within the network device when the classification of the executable file is determined to be malicious.

In summary, by operating on the binary code and avoiding disassembly operations and attention mechanisms, the computational analysis subsystem (as well as the cyber-security system) may be performed with greater operational efficiency during runtime of the network device than previously available. Additionally, where deployed within a network device such as an endpoint device, the computational analysis subsystem (and the cyber-security system containing the computational analysis subsystem) can determine whether a cyber-attack is occurring without significant degradation of the network device's (e.g., endpoint device's) performance, and as a result, may issue alerts in time for action to be taken to contain, mitigate or even block the effects of the cyber-attack. Lastly, by avoiding complete reliance on a preconceived notion as to what features should be sought (a tendency in many conventional approaches), a cyber-security system including the computational analysis subsystem and, in some embodiments, a combination of the computational analysis subsystem and the intelligence-driven analysis subsystem, provides a more holistic analysis of the executable file in detecting an attempted cyber-attack.

II. Terminology

In the following description, certain terminology is used to describe aspects of the invention. For example, in certain situations, the term "logic" is representative of hardware, firmware and/or software that is configured to perform one or more functions. As hardware, logic may include circuitry having data processing or storage functionality. Examples of such processing or storage circuitry may include, but is not limited or restricted to the following: a processor; one or more graphics processing units (GPUs); one or more processor cores; a programmable gate array; an application specific integrated circuit (ASIC); semiconductor memory; combinatorial logic, or any combination of the above components.

Logic or a logic module may be in the form of one or more software modules, such as a program, a script, a software component within an operating system, an application programming interface (API), a subroutine, a function, a procedure, an applet, a servlet, a routine, source code, object code, a shared library/dynamic load library, or even one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, etc.), a solid-state drive, hard disk drive, an optical disc drive, or portable memory device. As firmware, the executable code is stored in persistent storage.

The term "object" generally refers to a collection of data, whether in transit (e.g., over a network) or at rest (e.g., stored), often having a logical structure or organization that enables it to be classified for purposes of analysis. According to one embodiment, the object may be an executable file as previously defined, which can be executed by a processor within a network device. The binary code includes one or more instructions, represented by a series of digital values (e.g., logic "1s" and/or "0s"). Herein, the executable file may be extracted from one or more communication packets (e.g., packet payloads) propagating over a network.

A "section" may be generally construed as a portion of content extracted from a particular file. In one embodiment, the "section" may be a collection of binary code of a particular size extracted from an executable file. The section may be comprised of contiguous binary code from the executable file or non-contiguous binary code subsections that may be aggregated to form a single binary code section.

A "network device" generally refers to an electronic device with network connectivity. Examples of an electronic device may include, but are not limited or restricted to the following: a server; a router or other signal propagation networking equipment (e.g., a wireless or wired access point); or an endpoint device (e.g., a stationary or portable computer including a desktop computer, laptop, electronic reader, netbook or tablet; a smart phone; a video-game console; wearable technology such as a smart watch, etc.).

The term "transmission medium" is a physical or logical communication path to or within a network device. For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware. Also, the terms "compare" or "comparison" generally mean determining if a match (e.g., a certain level of correlation) is achieved between two items where, in certain instances, one of the items may include a particular signature pattern.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and is not intended to limit the invention to the specific embodiments shown and described.

II. General Architecture

Referring to FIG. 1, an exemplary block diagram illustrating logic deployed within a cyber-security system 100 using a feed-forward, artificial neural network 110 trained using supervised learning is shown. The artificial neural network 110 is a convolutional neural network (CNN) comprised of multiple layers, where each layer performs a specific function that assists in identifying features, namely a collection of values corresponding to patterns of binary code under analysis that may be probative in determining whether an executable file is associated with a cyber-attack. These CNN layers include one or more convolution layers performed by convolution logic 112, one or more pooling layers performed by pooling logic 114, and one or more fully-connected, nonlinearity (FCN) layers performed by FCN logic 116.

More specifically, the CNN 110 produces an output 130 based on a received input 120. The received input 120 includes encoded values each uniquely representing, for example, a corresponding measured unit of the binary code (e.g., nibble, byte, word, etc.). The convolution logic 112 includes a hierarchy of one or more convolution filters operating at each convolution layer to apply a programmatic layer function (e.g., weighting and/or biasing) on an incoming representation to produce a transformed, resultant representation. For a first convolution layer, the convolution logic 112 receives the incoming representation (i.e., the received input 120) and produces a resultant representation (e.g., one or more features extracted from the received input 120). For subsequent convolution layers, the convolution logic 112 receives the incoming representation, which may include the feature(s) produced by the last convolution layer (or feature(s) modified by an intermediary pooling layer as described below) instead of the received input 120. Hence, for each convolution layer, higher-level features may be extracted, where the number of convolution layers may be selected based, at least in part, on (i) accuracy improvements provided by each convolution layer and (ii) time constraints needed to analyze an executable file and conduct potential remediation actions (e.g., blocking, removal, quarantining, etc.) on a malicious executable file.

The pooling logic 114 operates in conjunction with the convolution logic 112. Herein, at a first pooling layer, the pooling logic 114 reduces the spatial dimension (size) of a feature produced by a preceding convolution layer. This "down-sampling" reduces the amount of additional computations needed by the CNN 110 in completing its analysis without significant adverse effects on accuracy of the analysis. Typically, for each pooling layer, a maximum (max) or average pooling technique is used, resulting in a fixed-length tensor that is smaller than the previous convolutional layer. For these techniques, the input, such as the features (represented by feature maps) may be divided into non-overlapping two-dimensional spaces. For average pooling, the averages of the pooling regions are calculated while, for max pooling, the maximum value of each pooling region is selected.

Another pooling technique utilized by one or more pooling layers may include dynamic pooling. For dynamic pooling, "k" best features (k≥2) are extracted during pooling, where the "k" value is dynamically calculated based on the length of the input (e.g., in bytes, bits, etc.) and/or the depth of the current pooling layer within the CNN hierarchy. The input (e.g., section of content under analysis) may vary in size during the analysis, and subsequent convolutional and pooling tensors will likewise vary in size in relation to the current depth in the hierarchy and length of the input. The variable-length tensors must be reduced to a common fixed size before interaction with the full-connected/nonlinearity logic 116. This dynamic pooling technique allows the classifier to learn and extract a number of features that is proportional to the length of the input, rather than limiting it to a fixed number of features. Furthermore, this approach enables feature extraction to be concentrated in a non-uniform manner across the input, essentially allowing for features to be more densely distributed than in the fixed-length case. The combination of these benefits results in an ability to extract and retain more long-term relationships among the features than would otherwise be possible for arbitrary input lengths.

For instance, as an illustrative example, for a first convolution layer of analysis, the convolution logic 112 controls the convolution filter(s) to convolve the incoming representation of a section the binary code to extract features, which are associated with patterns that may aid in analysis of the executable code for malware. Collectively, the number of features produced by each convolution layer is based on the input and the number of convolution filters selected. Thereafter, for a second (subsequent) convolution layer, the convolution logic 112 applies the convolution filters to the features (or spatially reduced features produced by an interposed pooling layer described above) to extract higher level features. According to this example, the higher level features may include instructions formed by nonlinear combinations of at least some of the features extracted at the first convolution layer. Similarly, for a third (subsequent) convolution layer, the convolution logic 112 applies the convolution filters to the features generated during the second convolution layer (or spatially reduced features produced by an interposed pooling layer described above) to identify even higher levels features that are associated with nonlinear combinations of the higher level features extracted by the second convolution layer.

It is contemplated that, after each convolution layer, various operations may be performed on the resultant representation (features) to lessen processing load for the CNN 110. For example, during a first convolution layer, after performing a convolution operation on the incoming representation (i.e., received input 120) by the convolution logic 112, element-wise nonlinear operations may be performed (e.g., by a rectified linear unit or "ReLU") on the resultant representation. The nonlinear operations map all negative values within the resultant representation to "0" in order to introduce nonlinearities to the resultant representation.

Referring still to FIG. 1, the FCN logic 116 is adapted to perform further nonlinearity operations on the resulting features to further uncover feature combinations that may aid in identifying the executable file is or is not associated with a cyber-attack. The resulting features undergo weighting and biasing operations to produce an output that takes into account nonlinear combinations from the entire input volume (e.g., all of the high-level features).

Communicatively coupled to the CNN 110, the classifier 140 is configured to receive the output 130 from the CNN 110 and determine a classification assigned to the executable file. This classification may be based, at least in part, on a threat score 145 generated by threat assessment logic 142, which conducts trained weighting and biasing operations on the received output 130. Such operations translate the received output 130 from a vector (e.g., an ordered sequence of two or more values) into a scalar value, where the scalar value is normalized as the threat score 145 bounded by a prescribed value range (e.g., 0-1; 0-10; 10-100, etc.).

Responsive to detecting the threat score 145 exceeding a prescribed threshold, the message generation logic 150 may generate an "alert" 155 (e.g., a message transmitted to report results of the analysis, especially upon detection of an executable file that may be associated with a cyber-attack). The alert 155 may include metadata associated with the analysis, such as executable file name, time of detection, network address(es) for the executable file (e.g., source IP, destination IP address, etc.), and/or severity of the threat (e.g., based on threat score, targeted network device, frequency of detection of similar executable files, etc.).

Figure 2:
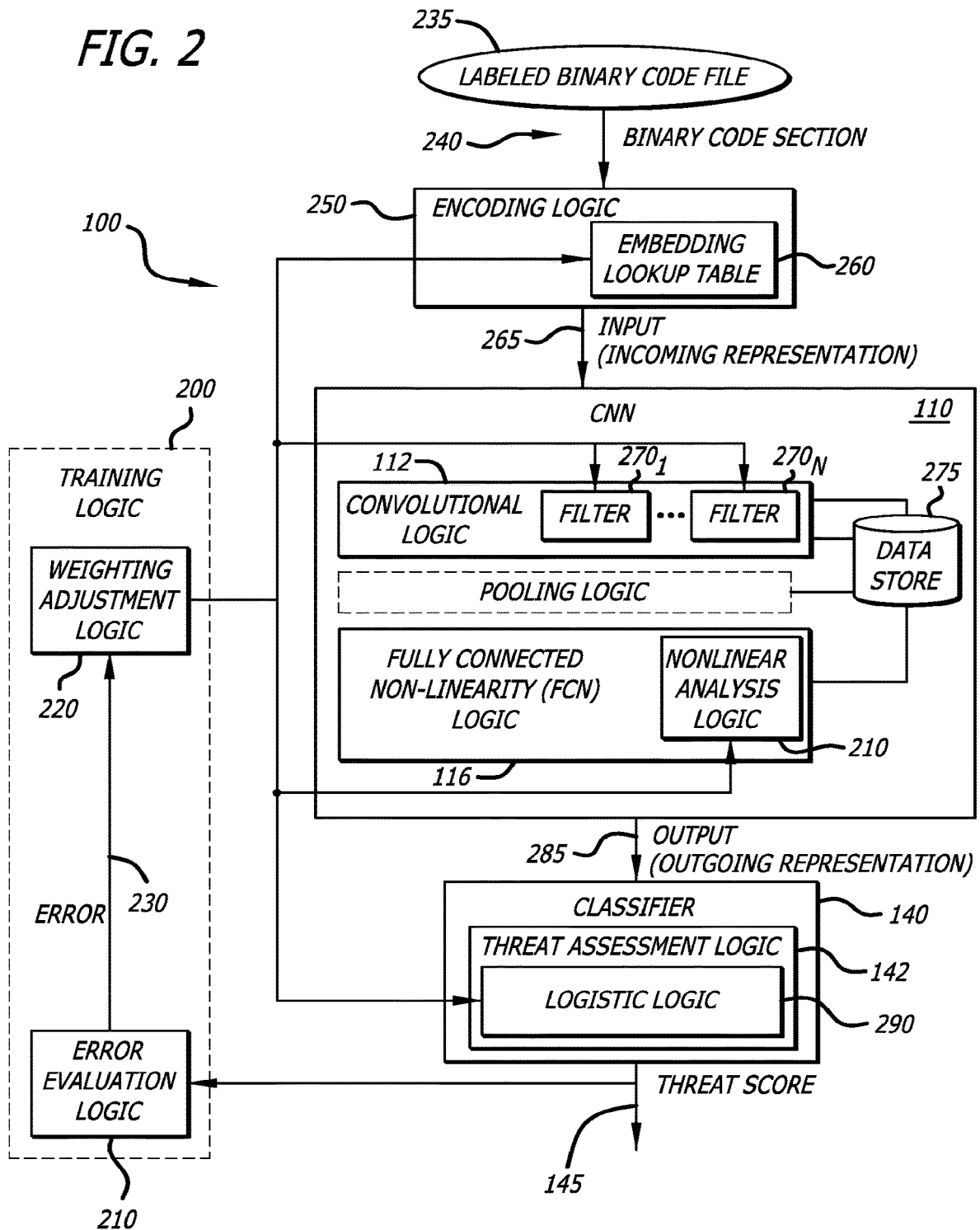
FIG. 2 is an exemplary block diagram of training logic for training of a convolution neural network (CNN) along with encoding logic and the classifier of FIG. 1.

Referring now to FIG. 2, an exemplary block diagram of training logic 200 for training certain logic of the cyber-security system 100, including the CNN 110, encoding logic 250 and the classifier 140 of FIG. 1 is shown. Herein, the training logic 200 includes error evaluation logic 210 and weighting adjustment logic 220. The error evaluation logic 210, upon completion of processing of a labeled binary code section 240, compares the value of a threat score generated by the classifier 140 to a known score assigned to the labeled binary code file (e.g., "1" for known malicious binary code file and "0" for known benign binary code file).

According to one embodiment of the disclosure, the error evaluation logic 210 computes a difference (i.e., the error) 230 between the threat score 145 and the known score and provides the error 230 to the weighting adjustment logic 220. Based on the determined error 230, the weighting adjustment logic 220 may alter encoded values set forth in the embedding lookup table 260 stored in memory. Additionally, or in the alternative, the weighting adjustment logic 220 may alter the weighting and/or biasing as applied by (i) the convolution filters $270_1$-$270_N$ (N≥1) within the convolution logic 112, (ii) nonlinear analysis logic 280 within the FCN logic 116, and/or (iii) logistic logic 290 within the threat assessment logic 142.

More specifically, during a training process that may occur on a periodic or aperiodic basis, a labeled training set of malicious and/or benign binary code files 225 is provided to the cyber-security system 100. The binary code files 225 are executable files used for training purposes. More specifically, the labeled training set includes a plurality of labeled, binary code sections associated with known malicious and/or benign executable files. Each labeled binary code section 240 is provided (as input) to the encoding logic 250. The encoding logic 250 is configured to encode portions of the labeled binary code section 240 (e.g., byte sequences), and thereafter, a representation of these encoded values (input representation) is processed by the convolution logic 112 within the CNN 110. For clarity, the encoding operations are described for byte sequences, although the encoding may be conducted for other measured units of data (e.g., bit nibble, word, dword, etc.).

The encoding logic 250 may rely on various types of encoding schemes, including "one hot encoding" and "embedding." For one-hot encoding, the encoding logic 250 substitutes a value of each byte sequence from the labeled binary code section 240 with a corresponding bitwise value from a unity matrix. As an illustrative example, for each byte sequence, the encoding logic 250 stores encoded values that are organized as a 257×257 unity matrix, where the last row/column is an encoded value assigned for padding. Hence, when analyzing the labeled binary code section 240 having a length "L", a byte value "2" from the labeled binary code section 240 would be encoded with the 257-bit value [0, 0, 1, 0 . . . 0] and the incoming representation 265, provided to the CNN 110 during the training process, would be a 257×L×1 tensor. A "tensor" is a multi-dimensional vector.

Another type of encoding scheme is "embedding," where the embedding lookup table 260 includes encode values for each byte sequence. During a training session, the embedding lookup table 260 is initialized to random values and, based on the machine learning function followed by the weighting adjustment logic 220, these encode values are adjusted. For this embodiment of the disclosure, the embedding lookup table 260 would be sized as a K×257 matrix, where "K" corresponds to the number of dimensions (rows/entries) for the embedding lookup table 260. Hence, each byte sequence of the binary code section 240 would be encoded to produce the input (incoming representation) 265 provided to the CNN 110.

The CNN 110 receives the input 265 and performs operations on the encoded values of the input 265 to produce an output (outgoing representation) 285 that concentrates its analysis on features that may be probative in determining whether the labeled binary code section 240 includes malware, as described above for FIG. 1. Based on the errors 230 determined for each successive, labeled binary code section 240, the weighting adjustment logic 220 may alter one or more weighting parameters of the convolution filters $270_1$-$270_N$ utilized by the convolution logic 112 in performing a specific programmatic layer function in efforts to reduce error for successively analyzed binary code sections. The weighting parameter(s) are stored in data store 275 along with biasing parameters, each associated with the application of a particular convolution filter $270_1$, . . . or $270_N$ and applied by the correlation logic 112 as the particular convolution filter $270_1, \ldots$ or $270_N$ convolves the incoming representation 265, as described above.

Additionally, based on the error 230 determined, the weighting adjustment logic 220 may alter one or more weighting parameters and/or a biasing parameter utilized by the nonlinear analysis logic 280 within the FCN logic 116, which is used in producing the output 285 from the CNN 110. An illustrated example as to how modification of the weighting parameter(s) and/or biasing parameter of the nonlinear analysis logic 280 may influence the output 130 is shown in FIG. 6E.

Lastly, based on the error 230 determined, the weighting adjustment logic 220 may alter one or more weighting parameters and/or a biasing parameter utilized by the logistic logic 290. The logistic logic 290 of the threat assessment logic 142 applies weighting to each parameter of the input 285 along with biasing to produce a scalar value. The scalar value is used by the threat assessment logic 142 to produce the threat score 145 for the labeled binary code section 240, which is used by the error evaluation logic 210 to determine the error 230 for potential "tuning" of (i) the weighting and biasing for the convolution filters $270_1$-$270_N$, (ii) the weighting and biasing for the nonlinear analysis logic 280, and/or (iii) the weighting and biasing for the logistic logic 290 as well as encode values within the embedding lookup table 260 (when embedding encoding is used).

Figure 3A:
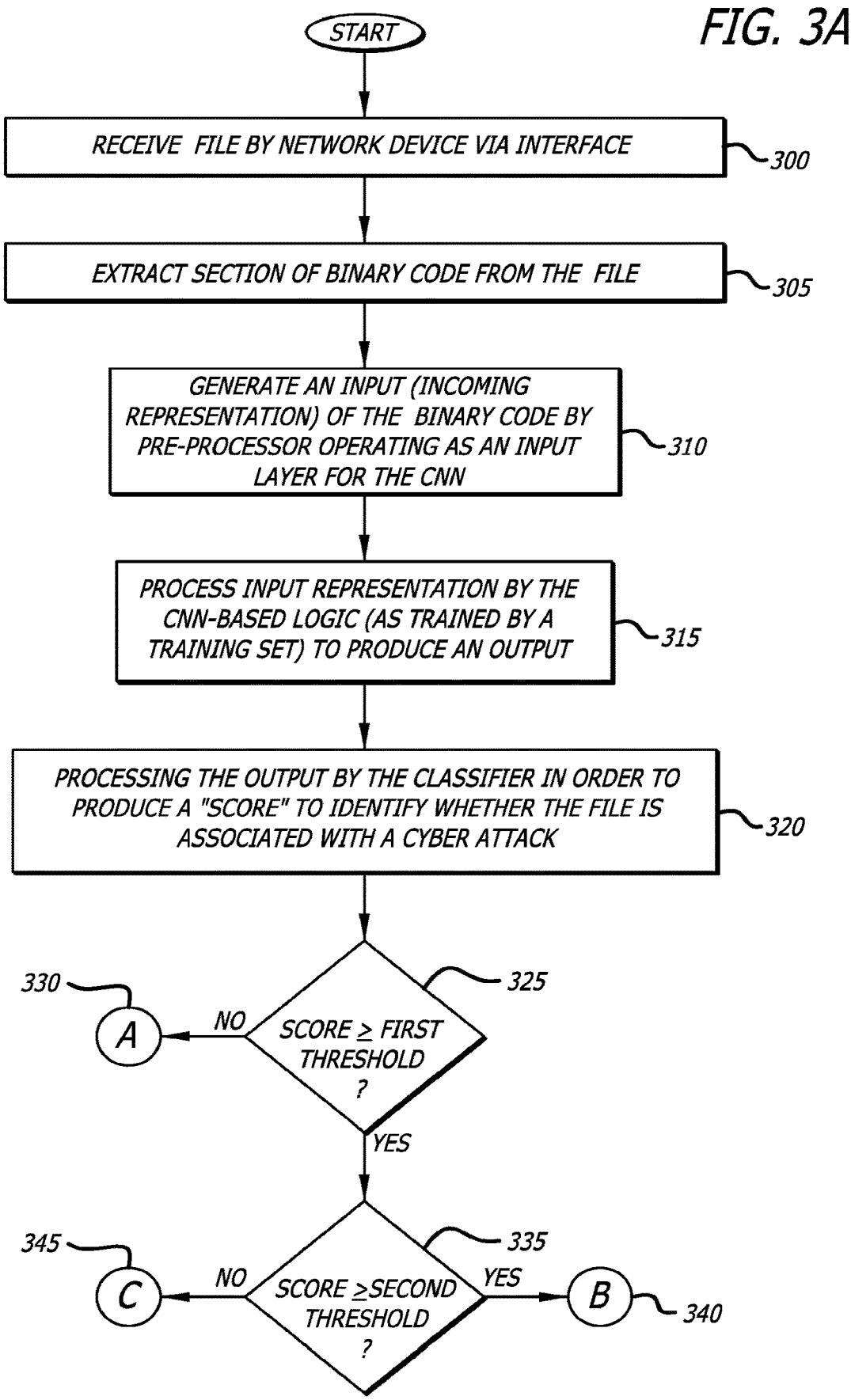
FIGS. 3A-3B are exemplary flowcharts illustrating operations performed by embodiments of a cyber-security system described herein.
Figure 3B:
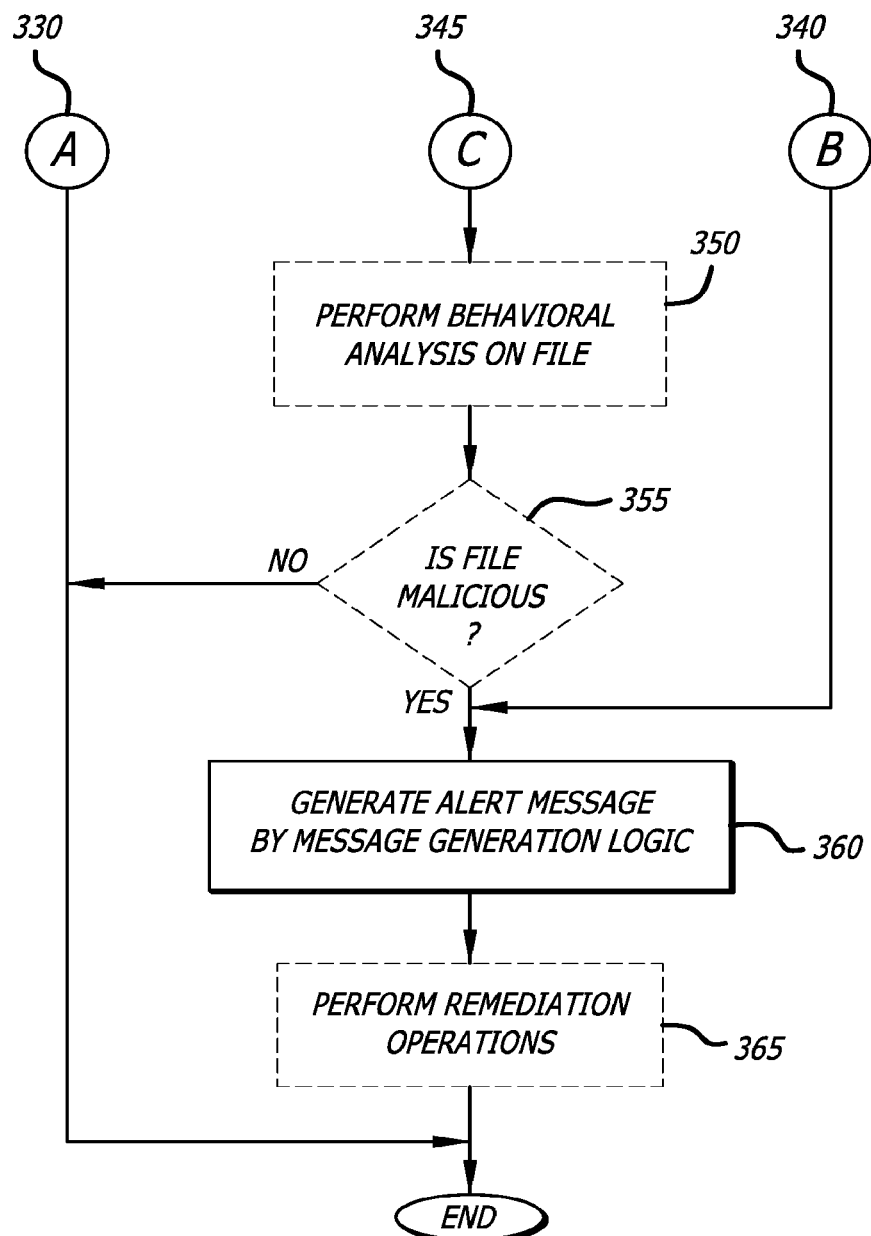

Referring to FIGS. 3A-3B, exemplary flowcharts illustrating operations performed by one embodiment of the cyber-security system 100 is shown. Herein, an executable file is received by a network device deploying the cyber-security system via an interface (block 300). For example, as an illustrative embodiment, the network device may obtain the executable file as a series of packets extracted during transmission over a network. Hence, the interface may be a communication port (and circuitry associated therewith) and/or a network interface (tap) that intercepts the binary packets forming the executable file and either (i) re-routes these binary packets to the network device, (ii) generates a copy of the binary packets associated with the executable file and provides these copied binary packets to the network device, or (iii) reassembles the binary code associated with the executable file prior to providing the binary code to the network device.

Herein, as shown in FIG. 3A, operating as an input layer to the CNN, a pre-processor (shown at 420 in FIG. 4A) of the cyber-security system extracts a section of binary code from the received executable file (operation 305). Additionally, the pre-processor generates an input, namely a representation of the binary code (operation 310). The input is provided to CNN-based logic (shown at 430 of FIG. 4A), which includes the convolution logic, the pooling logic and the FCN logic as described herein. The convolution logic, pooling logic and FCN logic are trained using supervised learning and generates an output in response to that input (operation 315).

The output from the CNN is provided to the classifier (shown at 140 of FIG. 4A) (e.g., to its threat assessment logic), which produces a threat score that indicates a likelihood of the executable file being associated with a cyber-attack (operation 320). Thereafter, the classifier may compare the threat score to different thresholds to determine what actions, if any, are to be taken (operations 325 and 330). As shown, where the threat score falls below a first threshold, the executable file is determined to be benign and no further actions are needed (operation path A). Where the threat score is equal to or exceeds the first threshold, another determination is made as to whether the threat score exceeds a second threshold (operation 335).

As shown in FIGS. 3A-3B, responsive to the threat score exceeding the second threshold, the classifier determines that the executable file is malicious and a message generation logic within the post-analysis subsystem (shown at 475 of FIG. 4B) generates an alert message to warn of a potential cyber-security attack based on detection of the malicious executable file (operations 340 and 360; operation path B). Additionally, or in the alternative, the cyber-security system may perform remediation operations on the malicious executable file to prevent execution of the executable file, such as quarantining the executable file, deleting the executable file, storing the executable file as part of a log and setting permissions to read only (for subsequent analysis), or the like (operation 365).

Referring still to FIGS. 3A-3B, in one embodiment, responsive to the threat score falling within a range between the first and second thresholds, a behavioral analysis is performed on the executable file in order to determine whether to classify the executable file as benign or malicious (operations 335 and 350; operation path C). Also, in one embodiment, responsive to the executable file being classified as malicious, (i.e., the threat score exceeding the second threshold), a behavioral analysis is performed on the executable file in order to verify a prior classification. It should be emphasized that embodiments of the invention can accurately detect whether an executable file should be classified as malware without employing behavioral analysis.

In particular, for behavioral analysis, the executable file is executed within a virtual machine instantiated by the network device (or, in other embodiments, in another network device) that is configured with a selected software profile (e.g., certain application(s), operating system, etc.). The selected software profile may be a software profile appropriate to execute the executable, for example, the software profile including operating system and one or more applications matching those used by the network device or a different software profile that is used by computers within an enterprise to which the network device is connected. The behaviors, namely the activity performed by the virtual machine and/or the executable file during execution, are monitored and subsequently analyzed to determine whether the executable file is considered to be malicious based on performance (or omission) of one or more behaviors corresponding to those of known malware (operation 355).

Where the executable file is benign, no further analysis of the executable file may be required (operation path A). However, if the executable file is determined to be malicious, logic within the cyber-security system may prompt the message generation logic to generate an alert message and/or perform remediation operations as described above (operations 360 and 365).

Figure 4A:
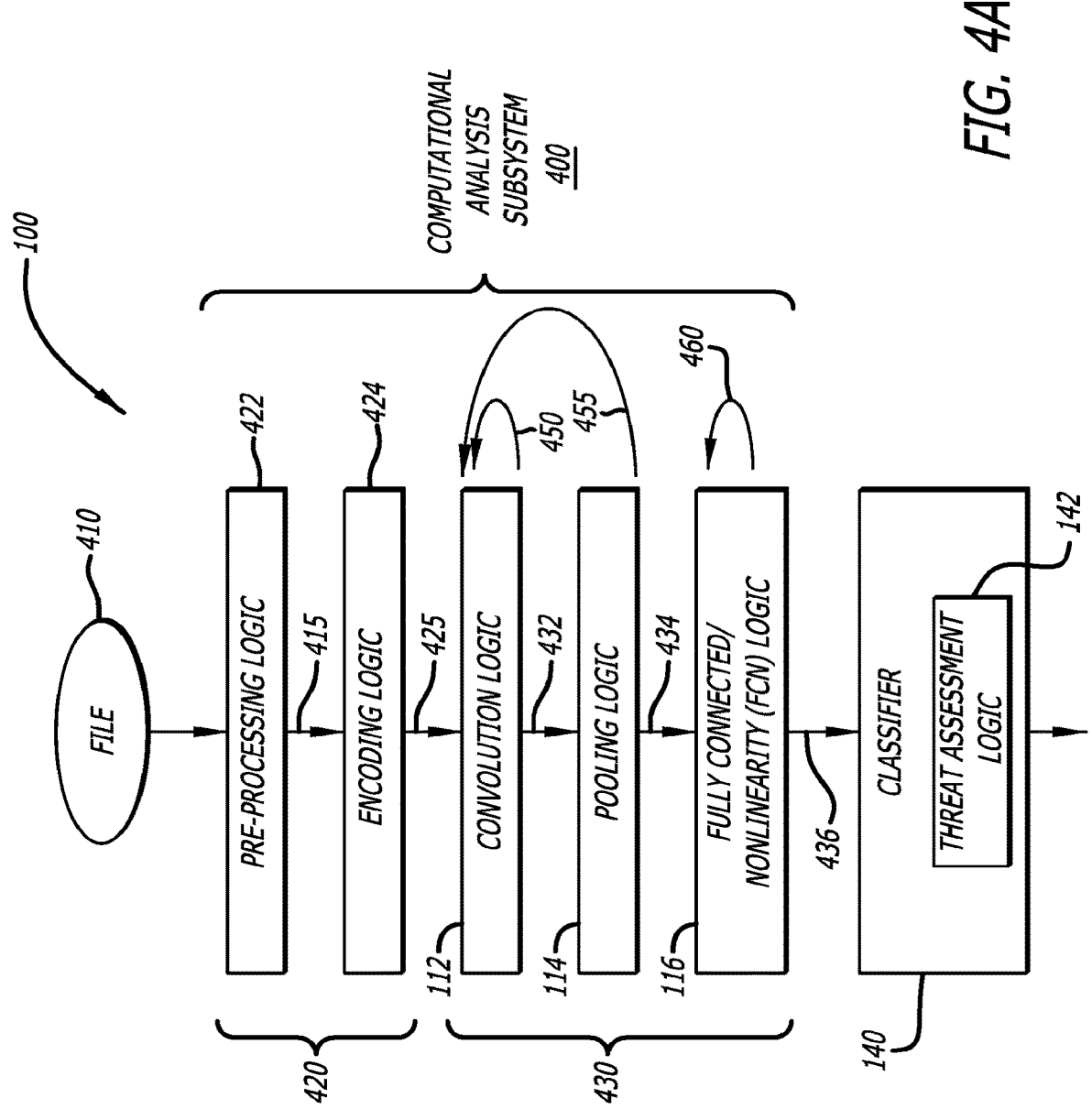
FIG. 4A is a first illustrative embodiment of the cyber-security system deploying a computational analysis subsystem, and a classifier collectively trained by training sets to analyze binary code from an executable file.

Referring now to FIG. 4A, a first illustrative embodiment of the logical operations and architecture of the cyber-security system 100 deploying a computational analysis subsystem 400 trained by training sets to analyze binary code from a file 410 is shown. Herein, according to one embodiment of the disclosure, the file 410 may be an executable. In other embodiments, for analysis by the cyber-security system 100, the file may be another file type, such as, for example, a text file, Portable Document Format (PDF) file, Presentation File Format (PPT) file, scripts; however, for convenience, the description will continue with respect to executable files as an illustrative example. Herein, the cyber-security system 100 is configured to analyze the executable file 410 (of any size) through the use of a CNN-based analysis. The computational analysis subsystem 400 includes a pre-processor 420 (pre-processing logic 422 and encoding logic 424), CNN-based logic 430 (convolution logic 112, pooling logic 114, and FCN logic 116), and the classifier 140 includes at least the threat assessment logic 142. Each of these logic components may be software running on a network device or on multiple network devices and collectively operate to determine whether the executable file 410 is malicious (i.e., associated with a cyber-attack) or is benign. The executable file 410 may be provided in a Portable Executable (PE) format including a Common Object File Format (COFF) header and a Section Table, although the executable file 410 may be provided in other formats.

The pre-processing logic 422 operates as part of an input layer of the computational analysis subsystem 400 to receive the executable file 410 as a file or as a collection of binary packets from which content may be extracted and aggregated (reassembled) to produce the executable file 410. It is contemplated that Transmission Control Protocol (TCP) sequence numbers within the binary packets may be relied upon to position the content of these binary packets in a correct order when forming the executable file. It is contemplated that the pre-processing logic 422 may further include decode logic and/or decompression logic to recover the binary code where some of the binary packets are encoded and/or compressed.

Upon receiving the executable file 410, the pre-processing logic 422 is responsible for selecting a section of binary code 415 from the executable file 410 for analysis. In some embodiments, the pre-processing logic 422 may select a plurality of sections of the binary code for analysis by the CNN-based logic 430, each being analyzed, separately or in combination, and conditioned for analysis. The size of the binary code section 415 may be a static (constant) value or dynamic based on rules established during the training and dependent on attributes of the binary code such as length or format.

Figure 4B:
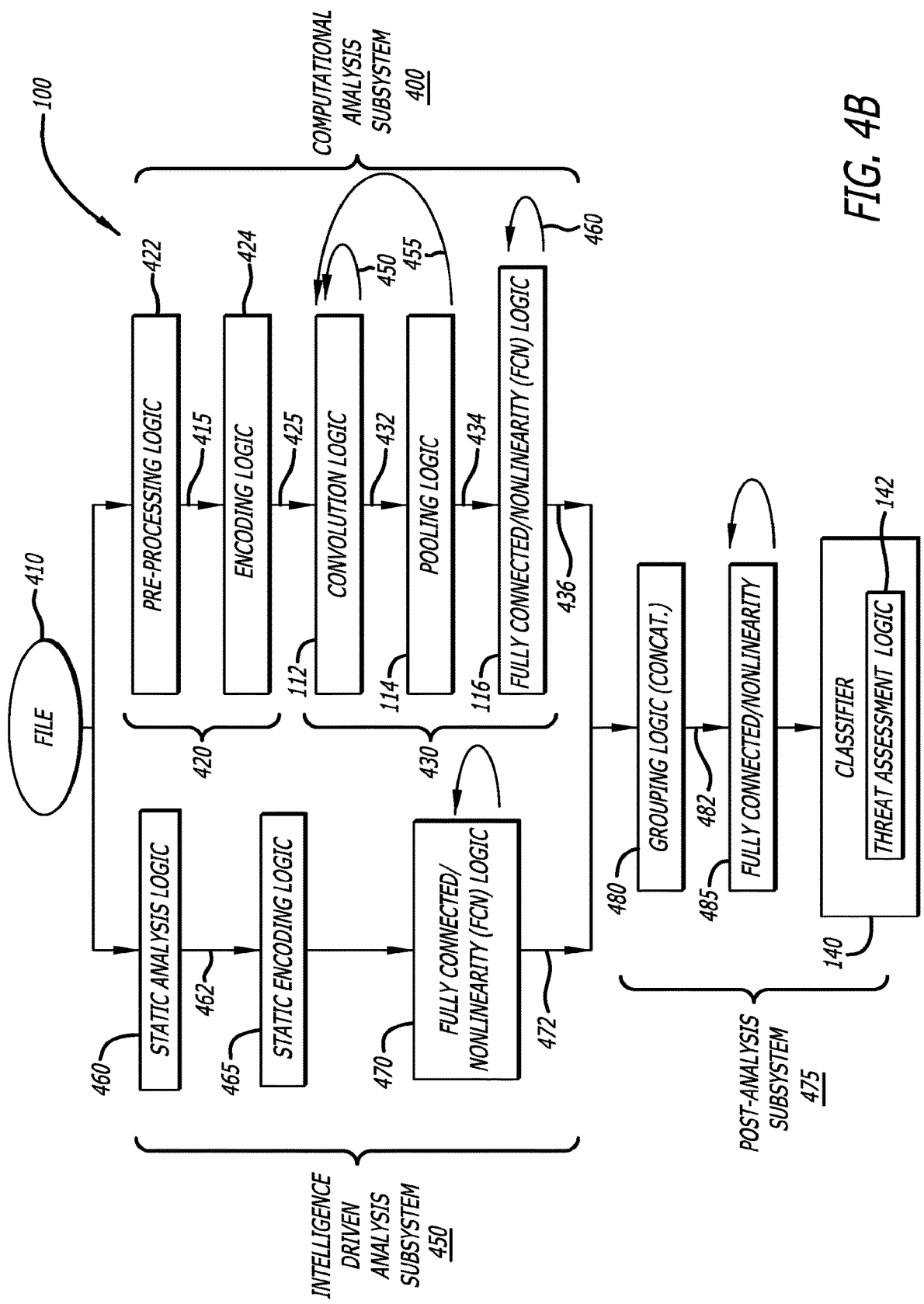
FIG. 4B is a second illustrative embodiment of the cyber-security system deploying a computational analysis subsystem, an intelligence-driven subsystem and a post-analysis subsystem collectively trained by training sets to analyze binary code from an executable file.
Figure 5:
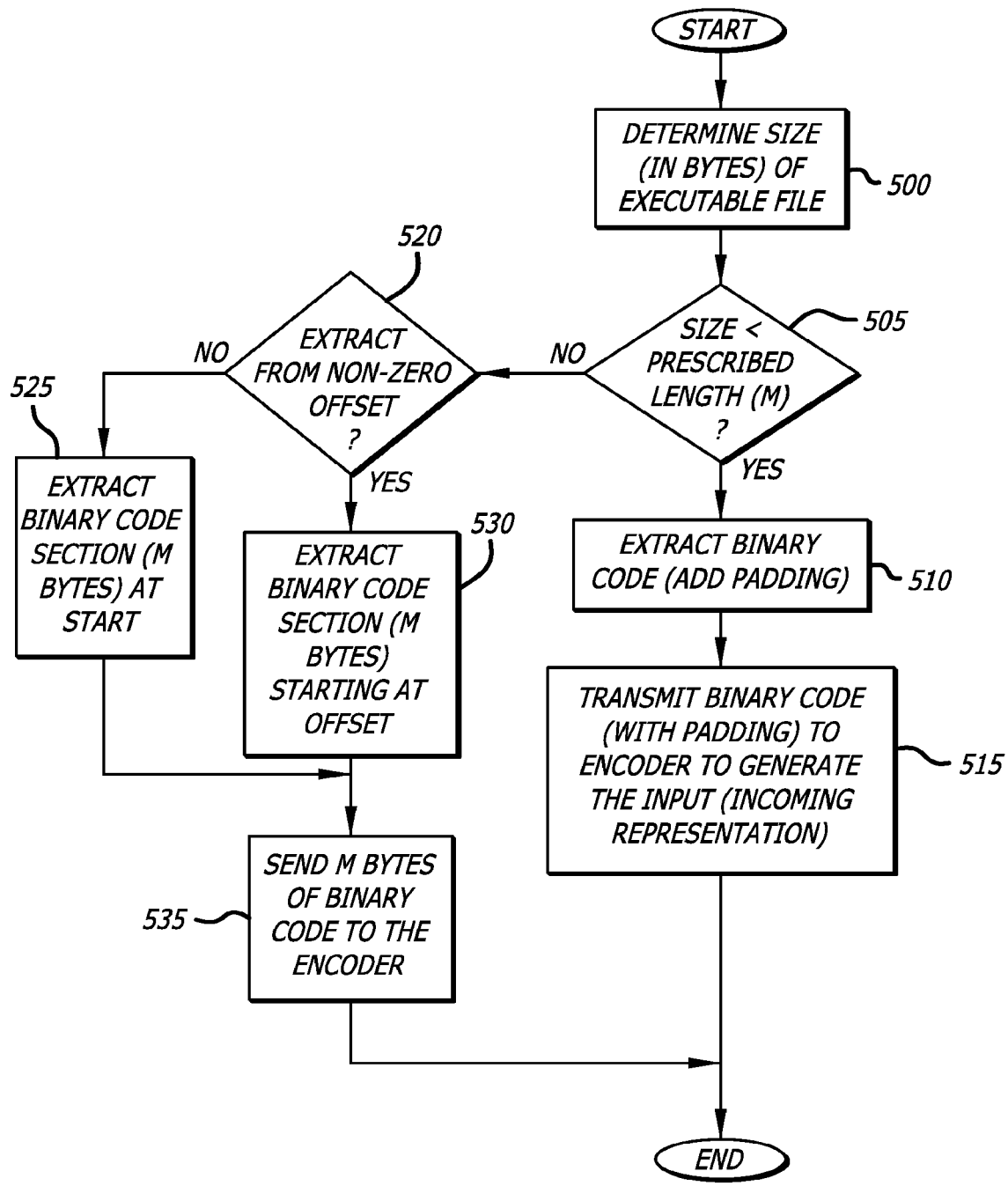
FIG. 5 is an illustrative embodiment of the operations performed by pre-processing logic of FIGS. 4A-4B operating on the binary code extracted from the executable file.

As shown in FIG. 5, an illustrative embodiment of the operations performed by the pre-processing logic 422 of FIGS. 4A-4B extracting the binary code section 415 from the executable file 410 is shown. The pre-processing logic 422 initially determines a size of the file and determines whether the size of the executable file exceeds a prescribed length "M" (operations 500 and 505). The metric used in the size calculations may be in the same measured units as the encoding, such as bytes for this illustrative example.

Where the size of executable file is less than a prescribed size (M), such as 100K bytes for example, which may be a static value set for the computational analysis or a value set by an administrator, the entire binary code of the executable file is extracted from the executable file (operation 510). This binary code, with additional padding as desired, is provided to the encoding logic to generate an input (incoming representation) for processing by the CNN (operation 515).

However, if the size of the executable file exceeds the prescribed value (M), the pre-processing logic 422 determines whether the selection of the binary code section is to be directed to contiguous binary code or multiple non-contiguous binary code subsections that can be aggregated as the binary code section (operation 520). By extracting subsections of binary code in lieu of extracting a single contiguous binary code section of size M, the computational analysis subsystem has an ability to analyze a broader range of the executable file. This broader analysis of the executable file, in some cases, may provide increased accuracy in classifying the executable file.

Where the binary code section is to be a single contiguous section of binary code, according to one embodiment of the disclosure, the pre-processing logic extracts "M" bytes at the start of the executable code (which may (or may not) be the entire binary code) (operation 525). These M bytes are provided to the encoding logic for use in generating the input to the CNN-based logic 430 through "one hot encoding," "embedding" or another encoding technique (operation 535). It is contemplated that, for certain embodiments, the "M" extracted bytes may be a dynamic value that can be altered, at least in part, based on the size of the input (e.g., file size).

Alternatively, where the binary code section is to be produced from binary code at a location different than the starting location or from an aggregate of subsections of binary code, the pre-processing logic 420 receives one or more offsets that denote starting memory address locations from which the pre-processing logic 420 extracts binary code from the executable file. The offsets may be preset based on file format (at positions where known malware tends to reside) or may be set by an administrator having knowledge of current malware insertion trends (operation 530). These subsections of binary code may be aggregated to produce the binary code section that is provided to the encoding logic (operation 535).

Referring back to FIG. 4A, upon receipt of the binary code section 415, the encoding logic 424 of the pre-processor 420 encodes binary code section 415 to generate a representation 425 of the binary code section 415 (referred to as the "input" 120 in FIG. 1) in a form and format suitable for processing by the CNN-based logic 430. The (byte) encoding may be conducted by a variety of techniques, including "one hot encoding" or "embedding," as described above.

Communicatively coupled to the encoding logic 424, the CNN-based logic 430 conducts operations represented by a plurality of executable logic layers ("layers") including one or more convolution layers by the convolution logic 112, one or more pooling layers by the pooling logic 114, and one or more fully connected/nonlinearity (FCN) layer by the FCN logic 116. Each of these convolution layers is configured to (i) process an incoming representation, such as input 425 for the first convolution layer, and (ii) apply operations in accordance with a programmatic layer function to produce a resultant representation 432. These operations may be performed using one or more convolution filters, which are pre-trained using a training set including patterns associated with benign executable files and/or malicious executable files as described above. Each resultant representation 432 is produced by convolving, based on a selected stride for the convolution, each filter over each incoming representation (e.g., input 425 or resultant representations 432 for subsequent convolution layers). The convolution layers are independent and may be performed successively as shown by feed-forward arrow 450 and/or after a pooling layer as referenced by feed-forward arrow 455. The depiction of feed-forward arrows 450 and 455 is merely for convenience to represent that multiple, independent convolution layers and one or more independent pooling layers may be performed by the computational analysis subsystem 400.

More specifically, after each convolution layer, certain operations may be performed on the resultant representation 432 until a final output 436 is produced by the CNN-based logic 430. For example, after the convolution logic 112 performs a convolution operation on the incoming representation (e.g., input 425), element-wise nonlinear operations (e.g., rectified linear unit or "ReLU") may be performed on the resultant representation 432 to provide nonlinearities to the resultant representation 432 for that convolution layer.

Additionally, after a convolution layer produces a resultant representation 432, a pooling layer may perform operations on the resultant representation 432. The pooling operation is conducted to reduce the spatial dimensions of the resultant representation 432 prior to providing to this transformed resultant representation 434 to a next convolutional layer (as identified by feed-forward 455) or to the FCN layer 116. Hence, as shown, the resultant representation 432 via feed-forward arrow 450 or transformed resultant representation 434 via feed-forward arrow 455 may operate as the incoming representation for a next convolution layer.

As yet another example of a weighting and/or biasing operation, the FCN logic 116 receives a resultant output representation from a convolution layer 432 or pooling layer 434, and thereafter, applies weights and biases once or in an iterative manner 460 to produce an output (vector) 436 from the CNN-based logic 430. Although not shown, it is contemplated that the FCN logic 116 may operate as an intermediary operation between convolution layers.

Communicatively coupled to the CNN-based logic 430, the classifier 140 is configured to receive the output 436 from the CNN-based logic 430 and classify the executable file, based, at least in part, on a threat score. The threat score is generated by threat assessment logic 142, which may perform a sigmoid function or other function to produce a scalar value, which is used to generate the normalized threat score representing a level of maliciousness as analyzed by the computational analysis subsystem 400.

Referring now to FIG. 4B, a second illustrative embodiment of the cyber-security system 100 deploying the preprocessor 420 and CNN-based logic 430 of the computational analysis subsystem 400 of FIG. 4A, an intelligence-driven subsystem 450 and a post-analysis subsystem 475 to analyze the executable file 410 is shown. Herein, operating concurrently (overlapping at least partially in time) or sequentially with the computational analysis subsystem 400, the intelligence-driven analysis subsystem 450 is configured to receive the executable file 410 and inspect the executable file for indicators associated with a cyber-attack. This inspection is conducted by static analysis logic 460 residing in the network device that is also performing the computational analysis described (see FIG. 7B) or residing in a different network device.

Where the executable file 410 is received in its entirety, the static analysis logic 460 is configured to conduct an analysis of the contents of the executable file 410 without any re-assembly. However, where the executable file 410 is received as a plurality of binary packets, the static analysis logic 465 is further configured to analyze the content of the binary packets forming the executable file 410 to identify any communication protocol anomalies and/or suspicious content in these packets. For example, with respect to payload inspection of the binary packets, the contents of the payloads may be extracted and reassembled to form the executable file for inspection. The header and other portions of the binary packets may be inspected separately.

According to one embodiment of the disclosure, the indicators may be based on intelligence generated by cyber-security analysts and captured in digital signatures (hashes) of known malicious executable files, heuristics and pattern matching based on known executable files, or the like. The comparison of the known indicators associated with malicious and/or benign executable files with the contents of the executable file 410 enables a determination as to whether the executable file 410 is malicious, such as including malware. Thereafter, the static analysis logic 460 produce an output 462 representing features computed from the detected indicators.

In some embodiments, the output 462 from the static analysis logic 460 may be provided to a static encoding logic 465. As a result, the static encoding logic 465 encodes the representative features into a format compatible with the format utilized by the computational analysis subsystem 400. In particular, the encoding may be based, at least in part, on the category of the feature.

More specifically, the static encoding logic 465 translates a Boolean, numeric and categorical features detected by the static analysis logic 460 and creates a vector of real values. For instance, where the feature is a Boolean value (true or false), the static encoding logic 465 translates or encodes the Boolean value as a digital "1" or "0". For numeric values, the static analysis logic 460 may convert a numeric value into a different type of numeric value, while categorical features may be encoded in accordance with the "one-hot encoding" technique (each categorical feature would be represented by a unique, encoded value). Hence, the static encoding logic 465 produces an output that, after undergoing nonlinear operations by FCN logic 470 and some pre-processing (e.g., normalization, scaling, whitening), is provided to the post-analysis subsystem 475 in a format similar to and compatible with output 436 from the FCN logic 116.

Herein, according to one embodiment of the disclosure, the post-analysis subsystem 475 includes grouping logic 480, FCN logic 485 to provide nonlinearity to the collective output 482 produced by the grouping logic 480, and the threat assessment logic 142. The grouping logic 480 combines the outputs 436 and 472 of these two subsystems into a result (e.g., concatenated result) to which nonlinear combinations of the outputs 436 and 472 from each subsystem are analyzed in determining a result provided to the threat assessment logic 142 to determine the threat score.

As mentioned above, the concurrent operations of the computational analysis subsystem 400 and the intelligence-driven analysis subsystem 450 complement each other. The intelligence-driven analysis subsystem 450 targets an analysis of the context of the executable file, e.g., anomalous data placement in binary packets, communication protocol anomalies, and known malicious and benign patterns associated with malicious and benign executable files. The computational analysis subsystem 400 targets digital bit patterns, independent of the context being analyzed by the intelligence-driven analysis subsystem 450. Hence, the computational analysis subsystem 400 is more content centric, which may better detect coding tendencies or styles by malware authors. The computational analysis subsystem 400 provides further assistance in the detection of zero-day (first time) cyber-attacks, where the malware is unknown and has not been previously detected, and in some cases, never analyzed previously.

Herein, the post-analysis subsystem 475 is communicatively coupled to both the computational analysis subsystem 400 and the intelligence-driven analysis subsystem 450, described above. The post-analysis subsystem 475 may include (i) grouping logic 480 and (ii) the classifier 490. According to one embodiment of the disclosure, the grouping logic 480 may be configured to perform mathematical or logical operations (e.g., concatenation) on content from the received outputs 436 and 472 to generate the collective output 482. The classifier 140, as described above, is configured to receive the collective output 482 from the grouping logic 480 and determine a classification assigned to the executable file 410 based, at least in part, on a threat score for collective output 482 in a manner as described above. The message generator (at 150 of FIG. 1) and/or remediation logic (at 760 of FIG. 7A) may be deployed to generate alerts and remediate malicious executable files as also described above.

Hence, by deploying the general operability of the computational analysis subsystem together with the intelligence-driven analysis subsystem 450, a more robust technique for classifying executable files is provided.

Figure 6A:
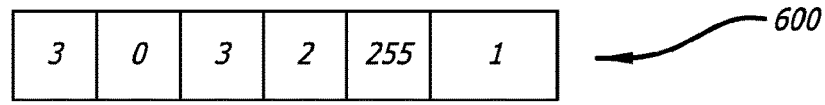
Figure 6B:
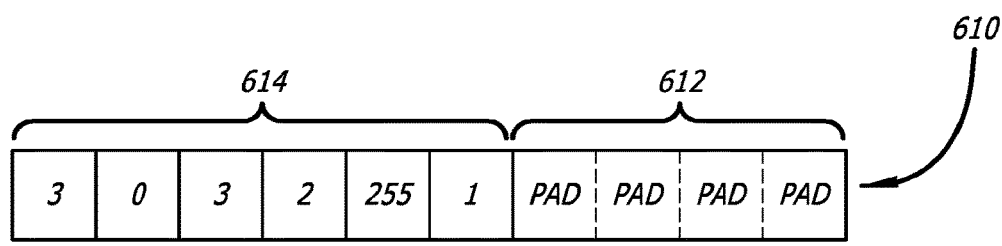
Figure 6C:
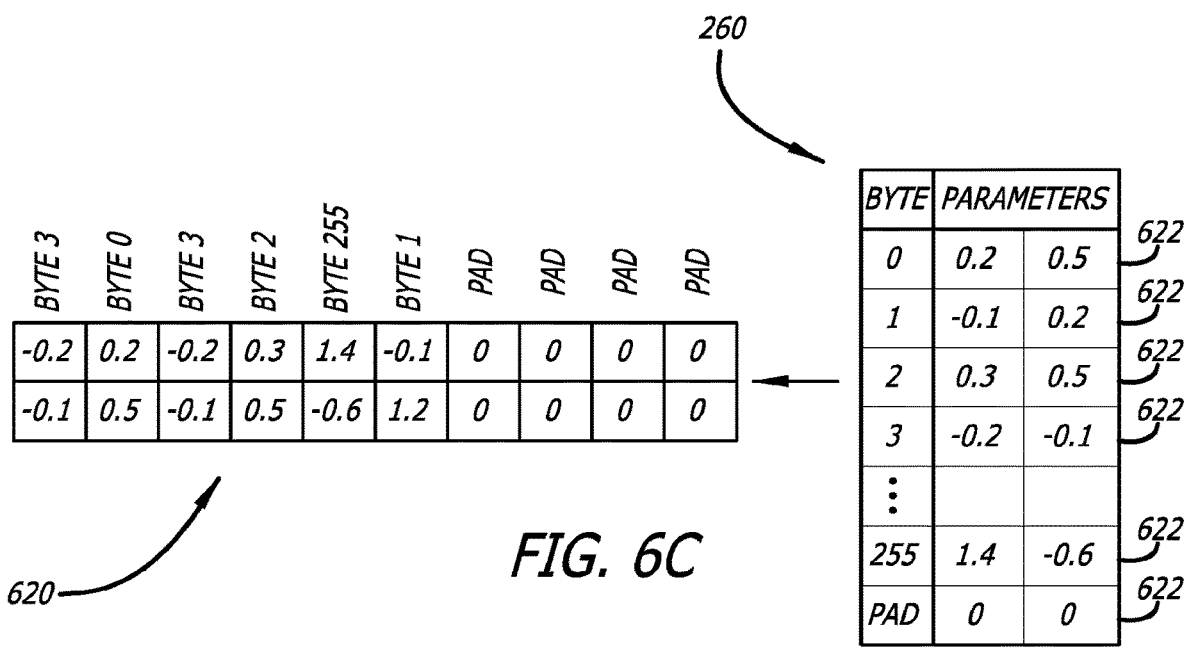
Figure 6D:
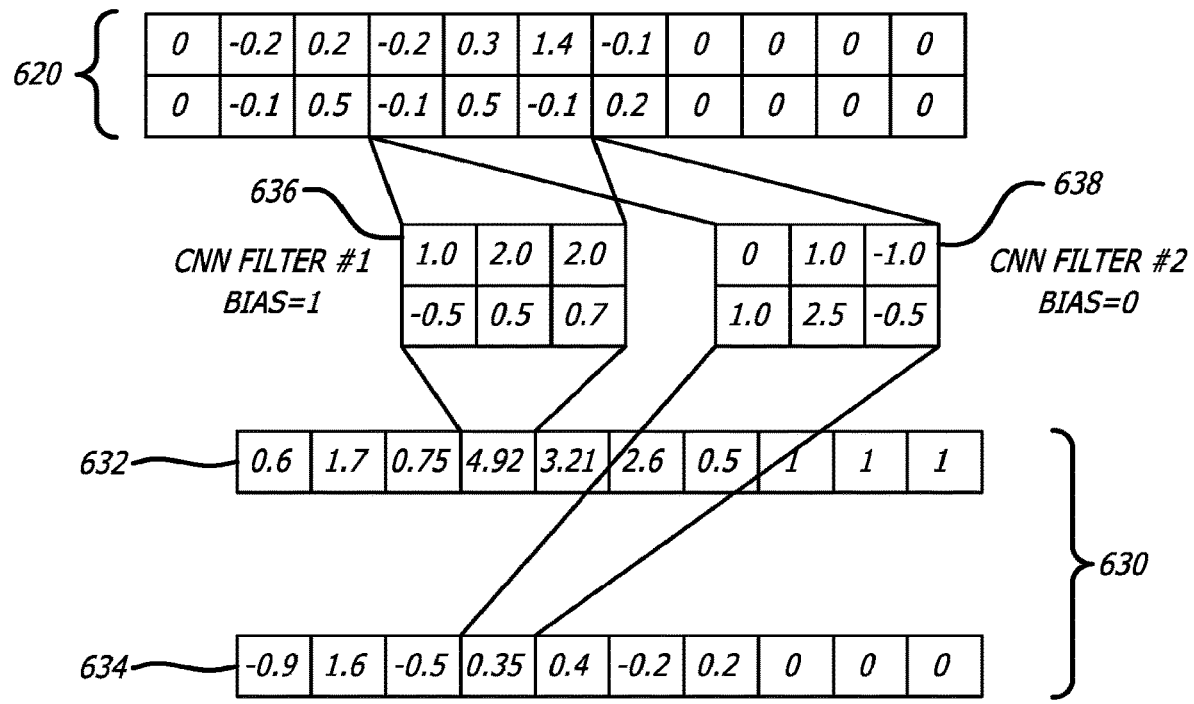
Figure 6E:
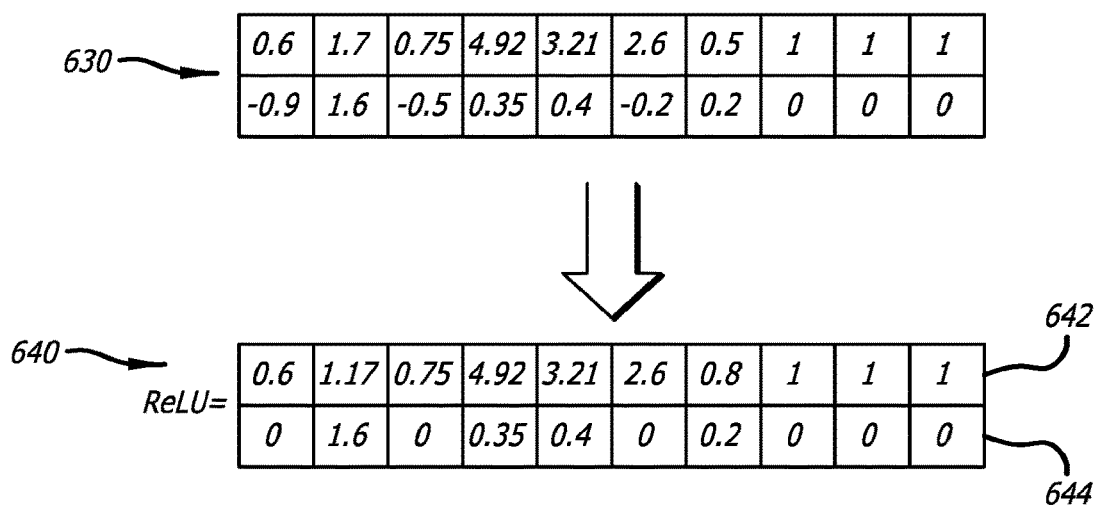

Referring to FIGS. 6A-6H, an illustrative example of operations conducted on an extracted binary code section of an executable file and subsequent representations of the binary code section substantially performed by logic of the computational analysis subsystem 400 of FIGS. 4A-4B is shown. For simplicity, as shown in FIG. 6A, a 6-byte executable file 600 is to be analyzed, although it is contemplated that the executable file 600 may be of any size (e.g., tens or hundreds of thousands of bytes), as the operations would be performed in a similar manner as described below.

Upon receiving the executable file 600, the pre-processing logic is responsible for extracting a section of binary code 610 from the executable file 600 for analysis. Herein, the section of binary code 610 is set to ten (10) bytes, which is larger in size than the executable file 600. As a result, padding 612 is added to actual extracted binary code 614 to produce the binary code section 610 as shown in FIG. 6B.

Referring to FIG. 6C, the binary code section 610 (with padding) is received by the encoding logic, which generates an input 620 in a form and format suitable for processing by the CNN. Herein, for this illustrative embodiment, the byte encoding is conducted in accordance with an embedding encode scheme, where the encoding logic substitutes each byte sequence with "K" element pairs 622 maintained in a K-dimensional embedding lookup table 260. The element pairs 622 are set and adjusted by the training logic during a training session.

Figure 6F:
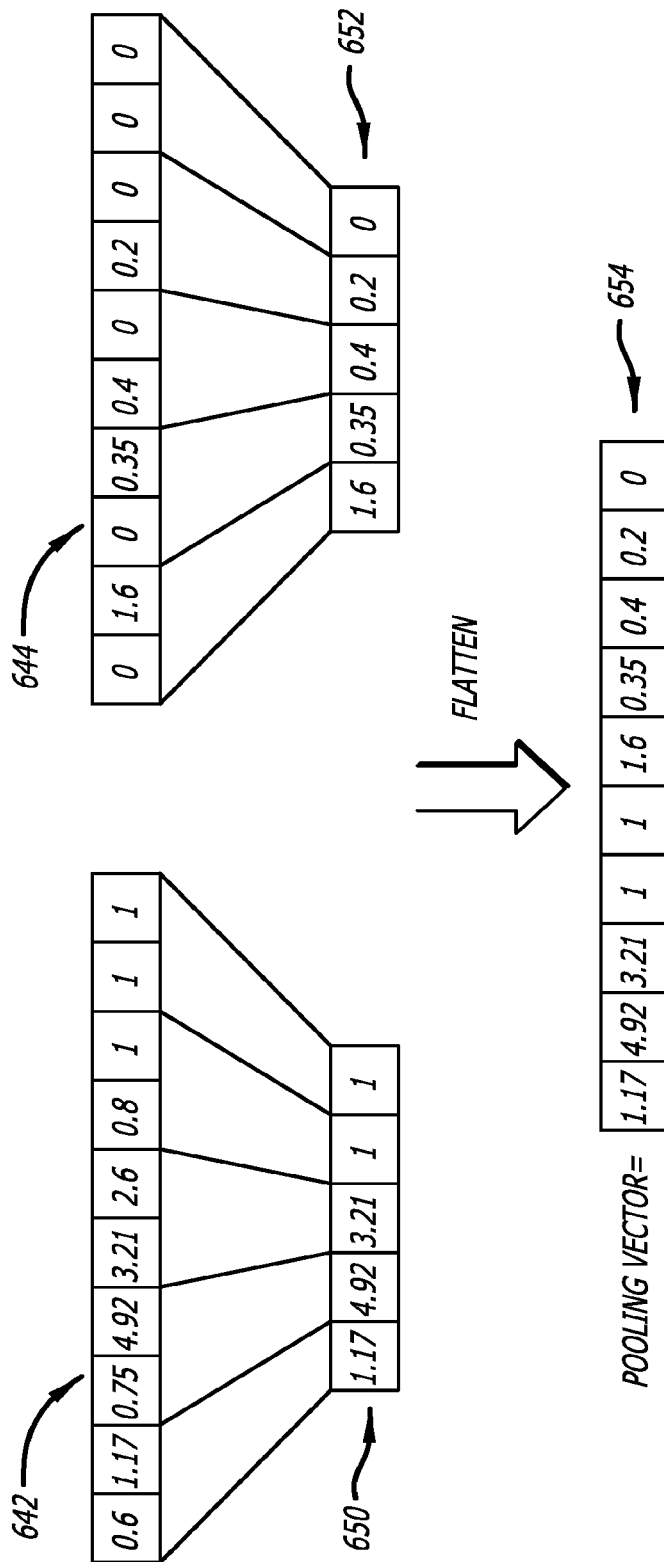
Figure 6G:
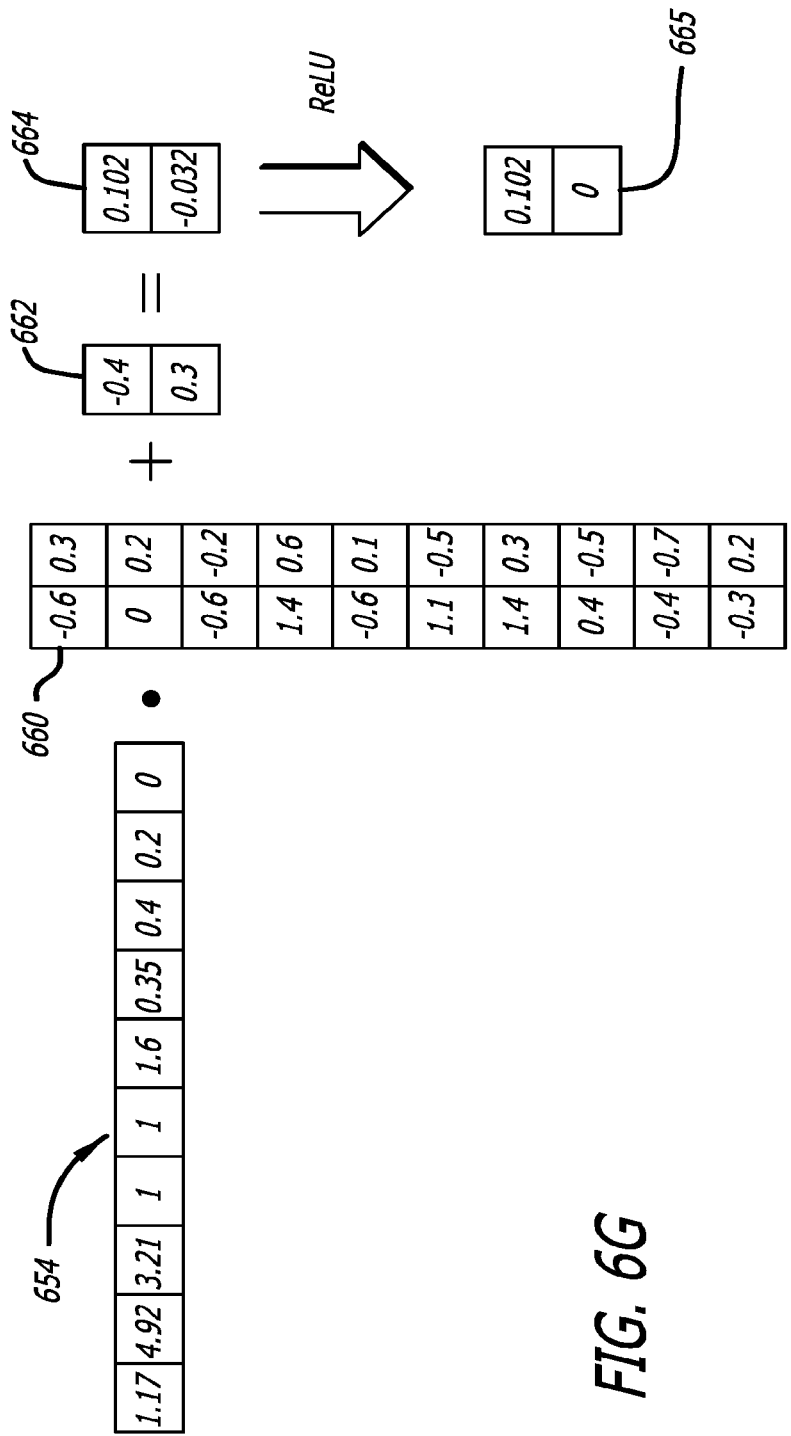

Communicatively coupled to the encoding logic, the CNN may be logically represented by a plurality of layer, including one or more convolution layers (see FIGS. 6D-6E), one or more pooling layers (see FIG. 6F), and one or more fully connected/nonlinearity (FCN) layers (see FIG. 6G). For this example, for simplicity, a sequential operation flow for each layer is discussed without any iterations. For instance, operations of a convolution layer and pooling layer are discussed without the output of the pooling layer being provided as an input (incoming representation) to another convolution layer featuring hyper-parameters and convolution filters that may differ from a prior convolution layer. Of course, it is contemplated that the operations may be performed in other embodiments in a similar manner, but with different inputs.

Herein, as an illustrative embodiment, the parameters for the convolution layer are set as follows: (i) the number of convolution filters ($M_O$) is set to "2" ($M_O$=2); (ii) amount of lengthwise, zero padding (P) permitted is equal to "1" (P=1); (iii) stride (S) is set to "1" (S=1); (iv) the length (F) of each convolution filter is set to "3" (F=3); (v) the height (K) of the convolution filter is set to the dimension (K) of the embedded matrix, which is "2" (K=2). Based on these settings, the input 620 provided to the convolution logic 112 of the convolution layer (see FIGS. 4A-4B) would be a 2×10×1 tensor while an output 630 (1×10×2 tensor) from the convolution layer is comprised of a first feature map 632 and a second feature map 634.

As shown in FIG. 6D, with a stride of "1", a first convolution filter 636 (with a bias of "1") operates on a first grouping of three parameter pairs of the input 620 [0, 0; −0.2, −0.1; 0.2, 0.5] to produce a convolution value "0.6". Next, the first convolution filter 636 shifts by a single element pair and operates on the next grouping of parameter pairs [−0.2, −0.1; 0.2, 0.5; −0.2, −0.1]. Such operations continue for the first convolution filter 636 to produce the first feature map 632 of the output 630. These operations are similarly performed using the second convolution filter 638 (with a bias of "0") to produce the second feature map 634 of the output 630. As illustrated, convolution operations on the grouping [−0.2, −0.1; 0.3, 0.5; 1.4, −0.1] are shown to produce convolution values of "4.92" and "0.35," respectively. As yet, the relevance of these convolution values is unclear as pooling and/or other weighting/biasing operations are subsequently performed.

After the above-described convolution operation is performed by convolution logic as shown in FIG. 6D, an element-wise nonlinear operation, such as a rectified linear unit (ReLU) operation as known in the art, may be performed on the output 630 from the convolution logic (i.e. each element for each feature map 632 and 634). The element-wise nonlinear operation maps all negative values within the output 630 to a zero ("0") element value in order to provide nonlinearities to the output 630 and produce a rectified, nonlinear output 640, including rectified features 642 and 644.

Thereafter, the pooling logic associated with the pooling layer may perform operations on the nonlinear output 640 in order to reduce its spatial dimensions. As shown in FIG. 6F, the pooling operation does not affect the height (K=2) dimension of the nonlinear output 640, where the height dimension equates to the number of convolution filters. Herein, for this illustrative example, max pooling operations are conducted where the pooling parameters include (i) the pooling length (PL) being set to "2" (PL=2) and (ii) the pooling stride (PS) being set to "2" (PS=2), which reduces the processing elements of the features 650 and 652 by fifty percent (50%). These reduced features 650 and 652 are "flattened" by producing a single pooling vector 654, which is provided to the fully connected/nonlinearity logic 116 of FIGS. 4A-4B.

Referring to FIG. 6G, the input into the fully connected/nonlinearity logic is the pooling vector 654 having a length (H) of "10" elements. One of the hyper-parameters set for the fully connected/nonlinearity logic is the number of hidden units ($H_O$), which sets the dimension of a weighting matrix (H×$H_O$) 660. As shown, the weighting matrix 660 is a 10×2 matrix. The bias parameter 662 is set during the training session, which is a vector of length "2" ($H_O$). Based on the input pooling vector 654, the output 665 from the CNN-based logic 430 is equal to [0.102, −0.032], and after conducting an element-wise nonlinear (e.g., ReLU) operation, the output 665 ([0.102, 0]) is determined. The output 665 from the CNN-based logic 430 (convolution and pooling) is a set of high level features that are useful for distinguishing benign binary code (goodware) from malware. An element in this tensor captures information contained in a contiguous byte sequence of the input 415, where the spatial extent of the byte sequence is dependent on convolution and pooling parameters. This positional information is lost when the output 655 is then run through a FCN layer.

Figure 6H:
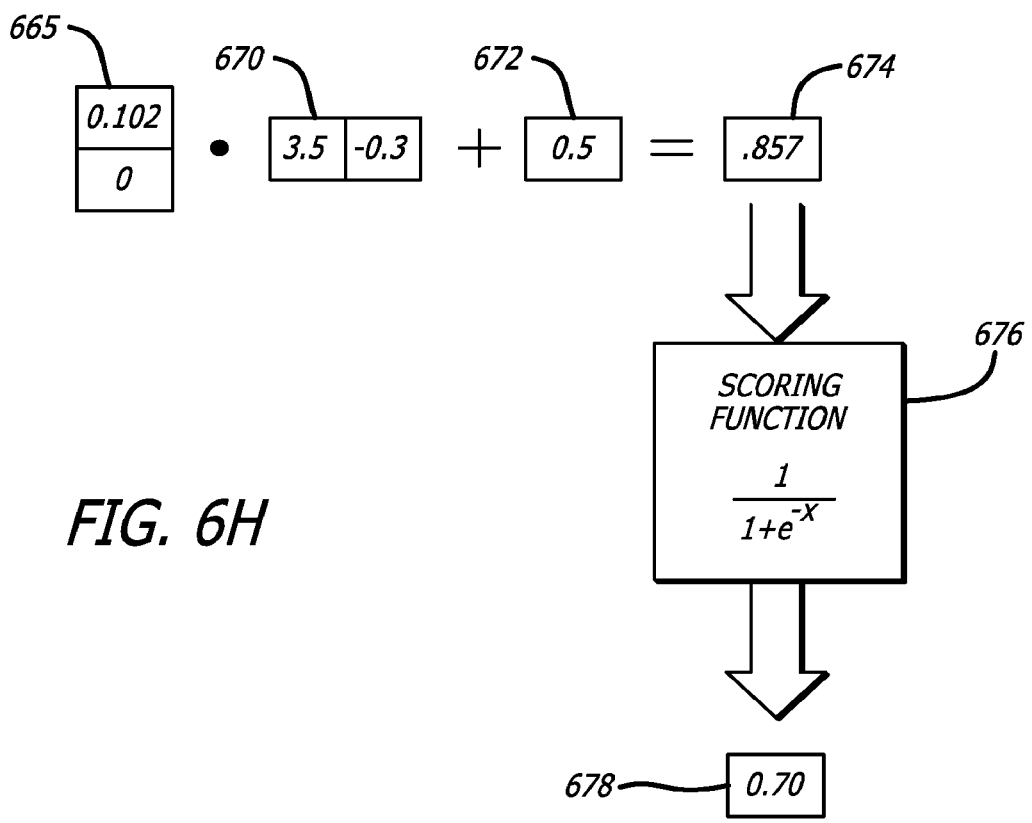

Communicatively coupled to the CNN-based logic 430, a classifier is configured to receive the output 665 from the CNN-based logic 430 and determine a classification assigned to the executable file. As shown in FIG. 6H, this classification may be accomplished by generating a threat score 678 based on the received output 665. As shown, a weighting vector 670 and a bias 672 is "tuned" during the training session, where the output 665 processed with the weighting vector 670 and the bias 672 provides a scalar value 674. Based on the scalar value 674, a threat score 678 is generating using a scoring function 676 (e.g., sigmoid function as shown), which identifies the likelihood of the executable file 600 being associated with a cyber-attack.

Figure 7A:
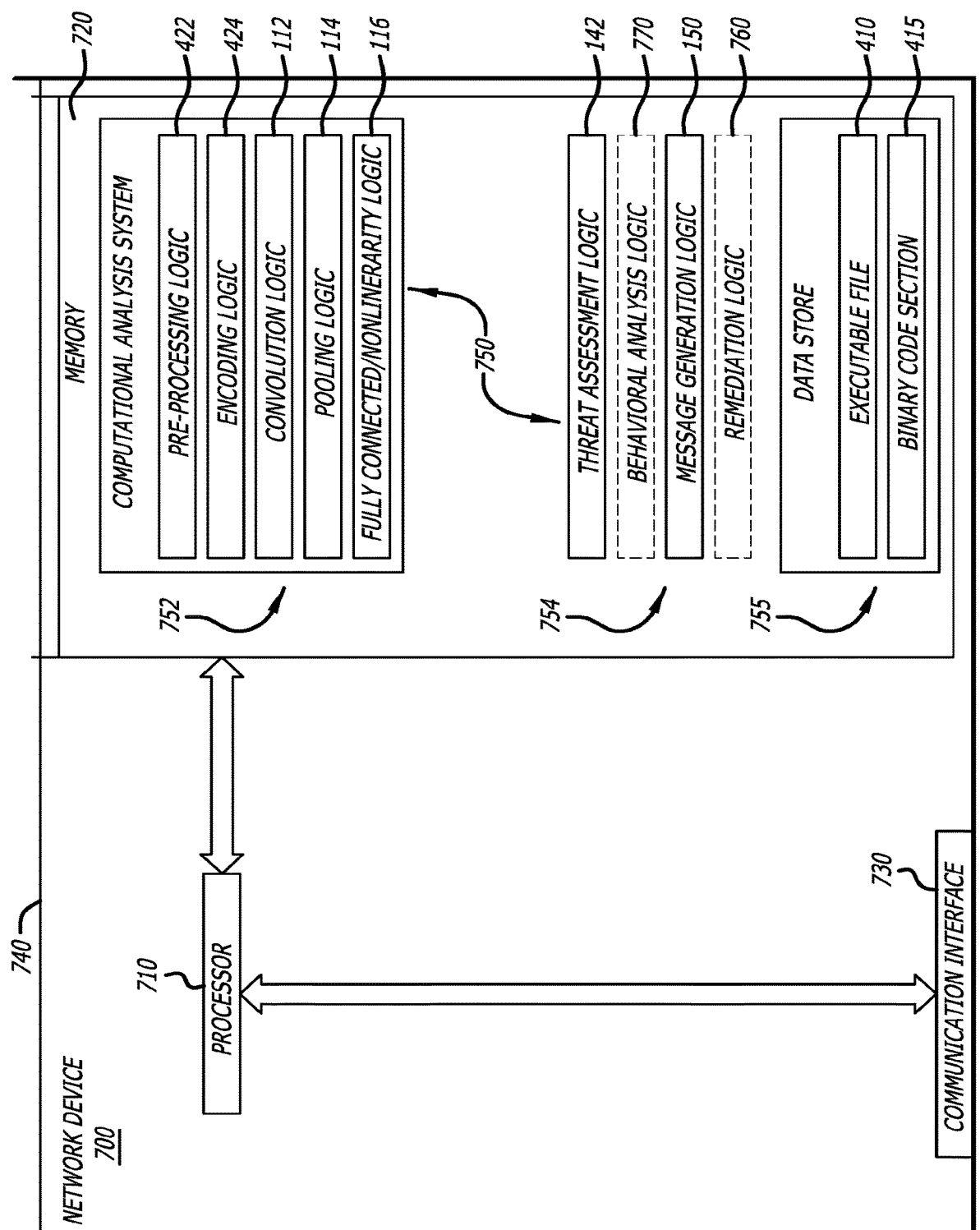
FIG. 7A is an illustrative embodiment of the network device including software modules that support operability of the first embodiment of the cyber-security system of FIG. 4A.

Referring now to FIG. 7A, an illustrative embodiment of a network device 700 including software modules that support operability of the first embodiment of the cybersecurity system of FIG. 4A is shown. According to this embodiment of the disclosure, the network device 700 comprises one or more hardware processors 710 (generally referred to as "processor"), a non-transitory storage medium 720, and one or more communication interfaces 730 (generally referred to as "interface"). These components may be at least partially encased in a housing 740, which may be made entirely or partially of a rigid material (e.g., hard plastic, metal, glass, composites, or any combination thereof) that protects these components from environmental conditions.

The processor 710 is a multi-purpose, processing component that is configured to execute logic 750 maintained within the non-transitory storage medium 720 operating as a data store. As described below, the logic 750 may include logic 752 controlling operability of the computational analysis subsystem and logic 754 to control operability of the classifier. As shown, the computational analysis subsystem logic 752 includes, but is not limited or restricted to, (i) pre-processing logic 422, (ii) encoding logic 424, (iii) convolution logic 112, (iv) pooling logic 114, and/or (v) FCN logic 116. The classifier logic 754 includes threat assessment logic 142, message generation logic 150, and optionally remediation logic 760 and/or behavioral analysis logic 770.

One example of processor 710 includes one or more graphic processing units (GPUs). Alternatively, processor 710 may include another type of processors such as one or more central processing units (CPUs), an Application Specific Integrated Circuit (ASIC), a field-programmable gate array, or any other hardware component with data processing capability.

According to one embodiment of the disclosure, as shown, the interface 730 is configured to receive incoming data propagating over a network, including the executable file 410 and at least temporarily store the executable file 410 in a data store 755. The executable file 410 may be received, as data packets, directly from the network or via a network tap or Switch Port Analyzer (SPAN) port, also known as a mirror port. Processed by the processor 710, the pre-processing logic 422 may extract and aggregate (reassemble) data from the packets to produce the executable file 410, and thereafter, select a section of the binary code for analysis.

Referring still to FIG. 7A, the encoding logic 424 is responsible for encoding the binary code section 415 to generate a representation of the binary code section 415 in a form and format that is suitable for processing by the convolution logic 112, pooling logic 114 and FCN logic 116, as illustrated in FIG. 4A and described above.

The carrier logic 754 includes the threat assessment logic 142 that is configured to receive an output from the computational analysis system logic 752. From the output, the threat assessment logic 142 determines a classification assigned to the executable file 410, as described above. The message generation logic 150 is configured to produce alert messages to warn of potential cyber-attacks while the remediation logic 760 is configured to mitigate the effects of the cyber-attack or halt the cyber-attack by preventing further operations by the network device caused by the executable file 410.

The behavior analysis logic 770 may be stored in the memory 720 and may be executed in response to the computational analysis being unable to determine whether the executable file 410 is malicious or benign or to verify any such determinations. As a result, the behavior analysis logic 770 creates a virtual machine (VM) environment and the executable file 410 is processed within the VM environment. The behaviors of the VM and the executable file 410 are monitored to assess whether the executable file 410 is malicious or benign based on the monitored behaviors.

Figure 7B:
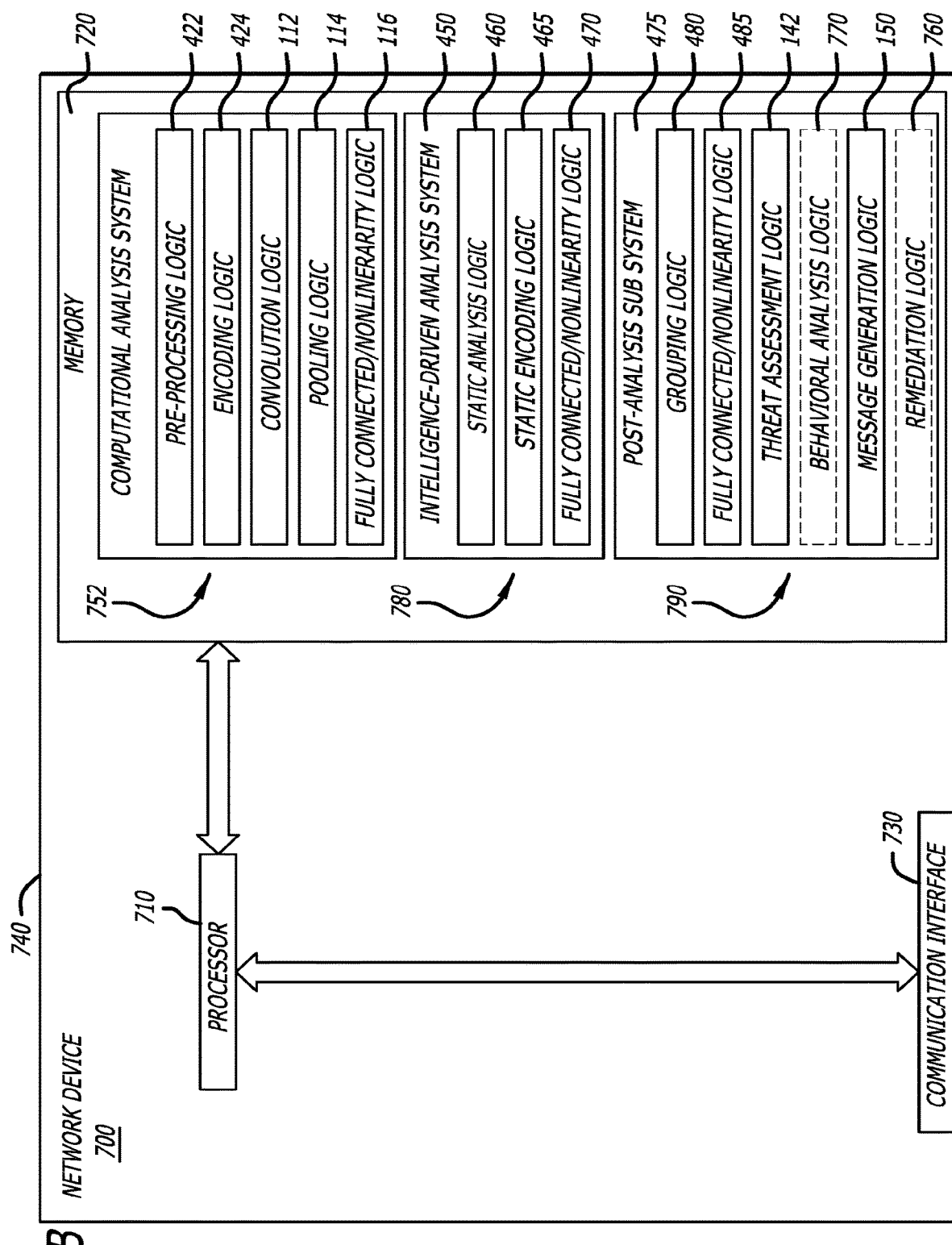
FIG. 7B is an illustrative embodiment of the network device including software modules that support operability of the second embodiment of the cyber-security system of FIG. 4B.

Referring now to FIG. 7B, an illustrative embodiment of the network device 700 including computational analysis subsystem logic 752 of FIG. 7A, along with logic 780 associated with the intelligence-driven analysis subsystem and logic 790 associated with the post-analysis subsystem logic is shown. Although not shown in detail, the executable file 410 and the binary code section 415 may be temporarily stored in a data store.

The network device 700 performs concurrent analysis of the executable file 410 using both the computational analysis subsystem logic 752 and the intelligence-driven analysis subsystem logic 780. The operations of the computational analysis subsystem logic 752 are described above. Concurrently operating with the computational analysis subsystem, logic 752, the intelligence-driven analysis subsystem logic 780 is configured to receive the executable file 410 and inspect the executable file 410 for indicators associated with a cyber-attack. This inspection is conducted by static analysis logic 460, which is configured to conduct an analysis of the contents of the executable file 410 without any reassembly. However, where the executable file 410 is received as a plurality of binary packets, the static analysis logic 460 is further configured to analyze the content of the binary packets forming the executable file 410 to identify any communication protocol anomalies and/or indicators (suspicious content) in these packets. The header and other portions of the binary packets may be inspected separately from the payload including the executable file 410.

According to one embodiment of the disclosure, the indicators may be based on intelligence generated by cybersecurity analysts and captured in digital signatures (hashes) of known malicious executable files, heuristics and pattern matching based on known executable files, or the like. The comparison of the known indicators associated with malicious and/or benign executable files with the contents of the executable file 410 enables a determination as to whether the executable file includes malware. Thereafter, the static analysis logic 460 produces an output including features representing the detected indicators, which is provided to the static encoding logic 465.

As shown in FIG. 7B, the static encoding logic 465 encodes the features into a format compatible with the format utilized by the computational analysis system logic 752. In particular, the encoding may be based, at least in part, on the category of the feature, as described above. The encoded features, which may be represented as a vector of numbers, undergo pre-processing (e.g., normalization, scaling, whitening) along with consideration of nonlinear combinations of the features using the FCN logic 470 before being provided the post-analysis subsystem logic 790.

Herein, according to this embodiment of the disclosure, the post-analysis subsystem logic 790 includes grouping logic 480, the FCN logic 485 to provide nonlinearity to the output of the grouping logic 480 and the threat assessment logic 142. The grouping logic 480 combines the results of these two subsystems, such as through concatenation, and the combined result is analyzed by the threat assessment logic 142 to determine the threat score used in determining whether the executable file 410 is malicious or benign.

As mentioned above, the concurrent operations of the computational analysis subsystem logic 752 and the intelligence-driven analysis subsystem 780 complement each other. The intelligence-driven analysis subsystem 780 targets an analysis of the context of the executable file 410, e.g., anomalous data placement in binary packets, communication protocol anomalies, and known malicious and benign patterns associated with malicious and benign executable files. The computational analysis subsystem logic 752, however, targets the digital bit patterns, independent of the context being analyzed by the intelligence-driven analysis subsystem logic 780, as described above.

Figure 8:
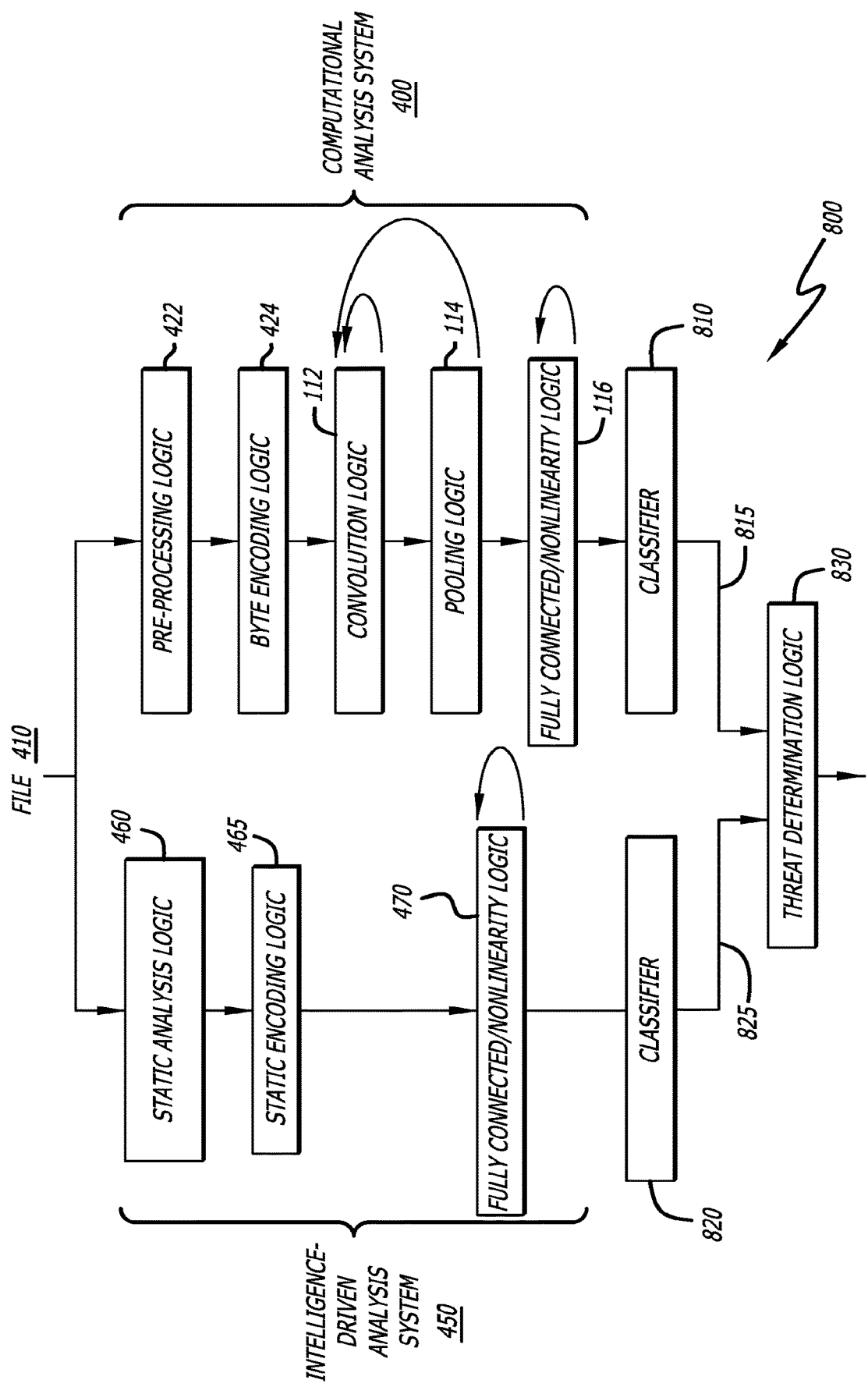
FIG. 8 is a third illustrative embodiment of the cyber-security system deploying a computational analysis subsystem, an intelligence-driven subsystem and a post-analysis subsystem collectively trained by training sets to analyze binary code from an executable file.

Referring now to FIG. 8, a third illustrative embodiment of the cyber-security system 100 deploying the computational analysis subsystem 400, the intelligence-driven analysis subsystem 450 and another type of post-analysis subsystem 800 is shown. Herein, the post-analysis subsystem 800 includes a first classifier 810 communicatively coupled to the FCN logic 116 to produce a first threat score 815 based on the features extracted by the computational analysis system 400. Similarly, the post-analysis subsystem 800 includes a second classifier 820 to produce a second threat score 825 based on indicators detected by the static analysis logic 460. Hence, the computational analysis subsystem 400 and the intelligence-driven analysis subsystem 450 may operate concurrently.

A threat determination logic 830 is configured to receive the first score 815 from the computational analysis system 400 and the second score 825 from the intelligence-driven analysis subsystem 450. Based on these scores, the threat determination logic 830 computes a resultant threat score that represents a threat level based on the collective analyses of the computational analysis system 400 and the intelligence-driven analysis subsystem 450.

In the foregoing description, the invention is described with reference to specific exemplary embodiments thereof. It will, however, be evident that various modifications and changes may be made thereto without departing from the broader spirit and scope of the invention as set forth in the appended claims. For instance, the selective system call monitoring may be conducted on system calls generated by logic outside the guest image.

What is claimed is:

1. A method for identifying whether a file including binary code is associated with a cyber-attack, the method comprising:
    receiving a first output from an intelligence-driven analysis subsystem configured to perform a static inspection, without execution, of the file and compute features of the file based on indicators associated with a cyber-attack detected during the static inspection;
    receiving a second output based on an analysis of the file by a computational analysis subsystem;
    generating a threat score based on the received first output and the received second output; and
    assigning a classification to the file as a benign file or a malicious file based, at least in part, on the threat score.

2. The method of claim 1, wherein the static inspection comprises an inspection of the binary code based on known and code associated with previously detected malicious executable files and code associated with previously detected benign executable files.

3. The method of claim 2, wherein the static inspection further comprises computing the features of the file by at least analyzing the content of the binary code forming the executable file to at least identify communication protocol anomalies in the content.

4. The method of claim 1, wherein the computational analysis subsystem is configured as a convolutional neural network.

5. The method of claim 4, wherein the received second output includes a second threat score based on feature combinations uncovered by a fully connected/nonlinearity logic implemented within the convolutional neural network.

6. The method of claim 5, wherein the second threat score is determined from the feature combinations undergoing one or more weighting and biasing operations to produce the second threat score.

7. The method of claim 5, wherein the second threat score is computed by logic within the computational analysis subsystem performing nonlinearity operations on the computed features to further uncover feature combinations that may aid in identifying the executable file is or is not associated with a cyber-attack.

8. The method of claim 5, wherein the second threat score is computed by logic within the computational analysis subsystem (i) conducting weighting and biasing operations on features of the feature combinations to produce a vector and (ii) translating the vector into a scalar value where the scalar value is normalized to produce the second threat score.

9. The method of claim 1, wherein the computational analysis subsystem includes an artificial neural network to automatically determine whether one or more features are present in the binary code of the executable file in which a presence of the one or more features causes the executable file to be classified as malicious without a need to manually pre-identify the one or more features for analytics by the computational analysis subsystem.

10. The method of claim 1, wherein the computational analysis subsystem is configured to perform the analysis directly on the binary code by at least determining whether one or more features associated with a cyber-attack are present or absent from the binary code of the executable file instead of a disassembled version of the binary code.

11. The method of claim 1, wherein the computational analysis subsystem is configured to perform the analysis directly on the binary code by at least determining whether one or more features associated with a cyber-attack are present or absent from the binary code of the executable file instead of a disassembled version of the binary code.

12. The method of claim 1, wherein the received first output includes a first threat score based on features uncovered based on a comparison between known indicators associated with at least one of malicious executable files or benign executable files with contents of the executable file, the features being translated through weighting of different features and normalization into the first threat score.

13. A system, implemented with non-transitory storage medium including software that, when executed, identifies whether a file is associated with a cyber-attack, the system comprising:
    a pre-processor being configured to (i) select a section of content from the file received as input and (ii) generate a first representation of the content;
    a neural network communicatively coupled to the pre-processor, the neural network being configured to process a network input being the first representation of the content by at least applying a plurality of weighting operations executing a programmatic function on the first representation to produce a network output, the programmatic function being trained using a training set including labeled patterns associated with at least one of (i) benign files and (ii) files associated with a cyber-attack;
a classifier communicatively coupled to the neural network, the classifier being configured to (i) receive the network output from the neural network and (ii) determine a classification assigned to the file based, at least in part, on a threat score corresponding to a scalar value generated from received network output from the neural network; and
a message generator configured to generate a message in response to determining the classification of the file as being associated with a cyber-attack.

14. The system of claim 13, wherein the file is an executable file and the content is binary code.

15. The system of claim 14, wherein the executable file comprises a Portable Executable (PE) file.

16. The system of claim 15, wherein the section of the binary code comprises a predetermined number of bytes from one of a starting location or an offset from the starting location of the PE file.

17. The system of claim 14 being communicatively coupled to an intelligence-driven analysis subsystem and a post-analysis subsystem, wherein:
the intelligence-driven analysis subsystem is configured to (i) receive the executable file, (ii) inspect the executable file for indicators associated with a cyber-attack, and (iii) produce a second output representing features associated with the detected indicators, and
the post-analysis subsystem to receive the second output from the intelligence-driven analysis subsystem and the network output from the neural network, the post analysis subsystem including the classifier.

18. The system of claim 17, wherein the post-analysis subsystem includes grouping logic to concatenate information associated with the received second output and the received network output, and the classifier communicatively coupled to the grouping logic to receive a representation of the concatenated information and determine the classification assigned to the executable file based, at least in part, on the threat score generated from on the representation of the concatenated information.

19. The system of claim 14 being implemented as an endpoint device including a processor and the non-transitory storage medium including remediation logic, wherein the remediation logic is configured to prevent execution of the executable file by the processor upon receiving the message from the message generator.

20. The system of claim 14, wherein the neural network corresponds to a convolutional neural network that operates directly on the section of the binary code without disassembly of the binary code.

21. The system of claim 14, wherein the message generated by the message generator comprises information identifying the executable file to preclude subsequent execution of the executable file.

22. The system of claim 13, wherein the pre-processor is configured to separate the binary code into a plurality of sections including a first section and a second section, and each of the plurality of sections having corresponding first representation processed separately by the neural network to generate a corresponding network output collectively operating as the network output provided to the classifier, and the classifier determines a classification of the executable file based on both of the corresponding network outputs.

23. The system of claim 13, wherein the neural network includes a convolutional neural network that operates on the section of the content of the file being binary code without disassembly of the binary code.

* * * * *